(12) United States Patent
Engelke et al.

(10) Patent No.: US 11,856,123 B1
(45) Date of Patent: Dec. 26, 2023

(54) TEXT ASSISTED TELEPHONY ON WIRELESS DEVICE METHOD AND APPARATUS

(71) Applicant: ULTRATEC, INC., Madison, WI (US)

(72) Inventors: Christopher R. Engelke, Verona, WI (US); Kevin R Colwell, Middleton, WI (US); Troy Vitek, Waunakee, WI (US)

(73) Assignee: ULTRATEC, INC., Madison, WI (US)

( * ) Notice: Subject to any disclaimer, the term of this patent is extended or adjusted under 35 U.S.C. 154(b) by 0 days.

(21) Appl. No.: 17/556,052

(22) Filed: Dec. 20, 2021

Related U.S. Application Data

(63) Continuation of application No. 17/489,383, filed on Sep. 29, 2021, now Pat. No. 11,570,291, which is a continuation of application No. 16/209,675, filed on Dec. 4, 2018, now Pat. No. 11,190,630, which is a continuation of application No. 15/285,641, filed on Oct. 5, 2016, now abandoned.

(60) Provisional application No. 62/246,905, filed on Oct. 27, 2015.

(51) Int. Cl.
*H04M 1/247* (2021.01)
*H04M 3/42* (2006.01)
*H04M 1/72412* (2021.01)

(52) U.S. Cl.
CPC ..... *H04M 1/2475* (2013.01); *H04M 1/72412* (2021.01); *H04M 3/42391* (2013.01)

(58) Field of Classification Search
CPC ........ H04M 1/72412; H04M 3/42391; H04M 1/2475
USPC .............................................. 455/466, 552.1
See application file for complete search history.

(56) References Cited

U.S. PATENT DOCUMENTS

| | | |
|---|---|---|
| 5,392,343 A | 2/1995 | Davitt et al. |
| 5,463,665 A | 10/1995 | Millios et al. |
| 5,671,267 A | 9/1997 | August et al. |
| 6,072,860 A | 6/2000 | Kek et al. |
| 6,075,842 A * | 6/2000 | Engelke ............... H04M 11/066 379/93.08 |
| 6,430,270 B1 | 8/2002 | Cannon et al. |
| 6,603,835 B2 | 8/2003 | Engelke et al. |
| 8,331,541 B1 | 12/2012 | Smith |
| 8,738,072 B1 | 5/2014 | Messerian |
| 10,469,660 B2 | 11/2019 | Engelke et al. |
| 10,491,746 B2 | 11/2019 | Engelke et al. |
| 10,587,751 B2 | 3/2020 | Engelke et al. |

(Continued)

FOREIGN PATENT DOCUMENTS

WO 9750222 A1 12/1997

OTHER PUBLICATIONS

Petition for Inter Partes Review for U.S. Pat. No. 10,469,660, *CaptionCall, LLC v. Ultratec, Inc.*, United States Patent and Trademark Office Before the Patent Trial and Appeal Board, Jul. 1, 2020, 68 pages.

(Continued)

*Primary Examiner* — Maria El-Zoobi
(74) *Attorney, Agent, or Firm* — Quarles & Brady LLP

(57) ABSTRACT

A communication system and method usable to facilitate communication between a hearing user and an assisted user. In particular, the system employs a wireless portable tablet or other portable electronic computing device linked to a captioning enabled phone as a remote interface for that phone, thereby providing an assisted user with more options, more freedom, and improved usability of the system.

47 Claims, 15 Drawing Sheets

(56) References Cited

U.S. PATENT DOCUMENTS

| | | |
|---|---|---|
| 2001/0005825 A1 | 6/2001 | Engelke et al. |
| 2002/0085685 A1 | 7/2002 | Engelke et al. |
| 2002/0193076 A1 | 12/2002 | Rogers et al. |
| 2003/0045329 A1 | 3/2003 | Kinoshita |
| 2003/0063731 A1 | 4/2003 | Woodring |
| 2003/0097262 A1 | 5/2003 | Nelson |
| 2005/0063520 A1 | 3/2005 | Michaelis |
| 2005/0064899 A1 | 3/2005 | Angelopoulos et al. |
| 2005/0129185 A1 | 6/2005 | McClelland et al. |
| 2005/0232169 A1 | 10/2005 | McLaughlin et al. |
| 2008/0187108 A1* | 8/2008 | Engelke ............ H04M 3/42161 704/E15.045 |
| 2009/0187956 A1 | 7/2009 | Sommer |
| 2009/0221321 A1* | 9/2009 | Fields ............... H04M 1/72436 455/552.1 |
| 2012/0076009 A1 | 3/2012 | Pasko |
| 2012/0212567 A1* | 8/2012 | Brooksby ............. H04M 11/08 348/E7.078 |
| 2012/0245936 A1 | 9/2012 | Treglia |
| 2013/0029671 A1 | 1/2013 | Islam |
| 2013/0144610 A1 | 6/2013 | Gordon et al. |
| 2014/0153705 A1 | 6/2014 | Moore et al. |
| 2014/0180667 A1 | 6/2014 | Johansson |
| 2015/0081860 A1 | 3/2015 | Kuehnel et al. |
| 2015/0094105 A1* | 4/2015 | Pan ......................... G10L 15/26 455/466 |
| 2015/0341486 A1* | 11/2015 | Knighton ................ H04W 4/16 455/414.1 |
| 2016/0112871 A1 | 4/2016 | White |
| 2018/0103136 A1 | 4/2018 | Holm et al. |

OTHER PUBLICATIONS

Declaration of Benedict J. Occhiogrosso for U.S. Pat. No. 10,469,660, *CaptionCall, LLC* v. *Ultratec, Inc.*, United States Patent and Trademark Office Before the Patent Trial and Appeal Board, Jun. 23, 2020, 113 pages.

Decision Denying Institution of Inter Partes Review for U.S. Pat. No. 10,469,660, *CaptionCall, LLC* v. *Ultratec, Inc.*, United States Patent and Trademark Office Before the Patent Trial and Appeal Board, Jan. 27, 2021, 24 pages.

U.S. Appl. No. 60/562,795 Provisional Application to McLaughlin et al., filed Apr. 16, 2004, 126 pages.

Blackberry, Rim Introduces New Color BlackBerry Handheld for CDMA2000 1X Wireless Networks, BlackBerry Press Release, Mar. 22, 2004, 2 pages.

Blackberry Wireless Handheld User Guide, 7750, Mar. 16, 2004, 144 pages.

Federal Communications Commission, Telecommunication Relay Services and Speech-to-Speech Services for Individuals With Hearing and Speech Disabilities, 68 Fed. Reg. 50973-50978 (Aug. 25, 2003).

Phonedb, Rim BlackBerry 7750 Device Specs, Copyright 2006-2020 PhoneDB, 6 pages.

Phonesdata, Nokia 6620 Specs, Review, Opinions, Comparisons, Copyright 2020, 9 pages.

Sundgot, Nokia Unveils the 6600, InfoSync World, Jun. 16, 2003, 2 pages.

Wikipedia, Dell Axim, https://en.wikipedia.org/wiki/Dell_Axim, Last Edited on Feb. 23, 2020, 4 pages.

Wikipedia, Palm Tungsten, https://en.wikipedia.org/wiki/Palm_Tungsten, Last Edited on Oct. 6, 2019, 10 pages.

Final Written Decision, U.S Pat. No. 9,131,045, Case IPR2015-01889, *CaptionCall, LLC* v. *Ultratec, Inc.*, United States Patent and Trademark Office Before the Patent Trial and Appeal Board, Apr. 11, 2017, 118 pages.

Judgment, U.S. Pat. No. 7,881,441, Case IPR2015-01886, *CaptionCall, LLC* v. *Ultratec, Inc.*, United States Patent and Trademark Office Before the Patent Trial and Appeal Board, Jun. 9, 2016, 4 pages.

Petition for Inter Partes Review for U.S. Pat. No. 10,491,746, *CaptionCall, LLC* v. *Ultratec, Inc.*, United States Patent and Trademark Office Before the Patent Trial and Appeal Board, Jul. 1, 2020, 61 pages.

Declaration of Benedict J. Occhiogrosso for U.S. Pat. No. 10,491,746, *CaptionCall, LLC* v. *Ultratec, Inc.*, United States Patent and Trademark Office Before the Patent Trial and Appeal Board, Jun. 23, 2020, 79 pages.

Decision Denying Institution of Inter Partes Review for U.S. Pat. No. 10,491,746, *CaptionCall, LLC* v. *Ultratec, Inc.*, United States Patent and Trademark Office Before the Patent Trial and Appeal Board, Jan. 27, 2021, 22 pages.

Arlinger, Negative Consequences of Uncorrected Hearing Loss—A Review, International Journal of Audiology, 2003, 42:2S17-2S20.

Petition for Inter Partes Review for U.S. Pat. No. 10,587,751, *CaptionCall, LLC* v. *Ultratec, Inc.*, United States Patent and Trademark Office Before the Patent Trial and Appeal Board, Jul. 1, 2020, 64 pages.

Declaration of Benedict J. Occhiogrosso for U.S. Pat. No. 10,587,751, *CaptionCall, LLC* v. *Ultratec, Inc.*, United States Patent and Trademark Office Before the Patent Trial and Appeal Board, Jun. 23, 2020, 106 pages.

Decision Granting Institution of Inter Partes Review for U.S. Pat. No. 10,587,751, *CaptionCall, LLC* v. *Ultratec, Inc.*, United States Patent and Trademark Office Before the Patent Trial and Appeal Board, Jan. 27, 2021, 24 pages.

Judgment Granting Request for Entry of Adverse Judgment After Institution of Trial for U.S. Pat. No. 10,587,751, *CaptionCall, LLC* v. *Ultratec, Inc.*, United States Patent and Trademark Office Before the Patent Trial and Appeal Board, Apr. 28, 2021, 3 pages.

Curtis et al., Doctor-Patient Communication on the Telephone, Can Fam Physician, 1989, 35:123-128.

\* cited by examiner

TEXT ASSISTED TELEPHONY ON WIRELESS DEVICE METHOD AND APPARATUS

CROSS-REFERENCE TO RELATED APPLICATIONS

This application is a continuation of U.S. patent application Ser. No. 17/489,383, filed Sep. 29, 2021, which is a continuation of U.S. patent application Ser. No. 16/209,675, filed Dec. 4, 2018, and issued as U.S. Pat. No. 11,190,630 on Nov. 30, 2021, which is a continuation of U.S. patent application Ser. No. 15/285,641, filed on Oct. 5, 2016, which claims the benefit of priority to U.S. provisional application No. 62/246,905, filed Oct. 27, 2015, each of which is incorporated herein by reference in its entirety.

STATEMENT REGARDING FEDERALLY SPONSORED RESEARCH OR DEVELOPMENT

Not applicable.

BACKGROUND OF THE DISCLOSURE

The field of the disclosure is text assisted telephony and more specifically telephony to help deaf or hard of hearing users receive captioned text from a relay on a personal portable device.

Systems have been developed to provide text captioning of voice calls to a deaf or hard of hearing person (hereinafter "an assisted user") to aid the assisted user in understanding words annunciated into a telephone by a remote hearing user. In at least some cases these systems rely on an assisted user having access to a captioned telephone that includes a speaker, a microphone and a display screen and that is capable of connecting to first and second communication lines. Here, when a phone call occurs using the captioned telephone linked to a first of the communication lines and an assisted user requires captioning, the captioned telephone is linked via the second line to a relay service and a hearing user's voice signal (e.g., the voice of the person linked to the caption device via the first line) is provided to the relay service. A call assistant at the relay receives the voice signal of the hearing user and converts that voice signal to a text stream which is sent back to the captioned telephone and presented to the assisted user via the display screen. In at least some cases it is contemplated that automated software at the relay may convert some or all of the hearing user's voice signal to text so that no call assistant is required.

In at least some cases the captioned telephone is equipped with a relatively large display screen (e.g., 7 to 10 inch diameter) so that the text presented on the screen can be relatively large to accommodate persons that also have trouble seeing smaller text fonts. Captioned telephones also often come with r speakers that can generate high volume signals to broadcast a hearing user's voice signal to an assisted user when the assisted user has at least some ability to hear.

While captioned telephones have proven extremely useful and have advantageously changed the way deaf and hearing assisted users communicate, one problem with the captioned telephone solution is that the captioned telephone devices are somewhat expensive and therefore most assisted users only have a single captioned telephone device. In cases where an assisted user only has a single captioned telephone device, the single device can only be located at a single location which means that the assisted user has to travel to that device location in order to use the captioning service. For instance, where an assisted user's captioned telephone device is located in her kitchen, if the assisted user is located in her bedroom when a call is received or when she decides to place a call for which captioning is required, the user has to travel to her kitchen in order to participate in the captioned call. As another instance, if another assisted user is sitting on his couch watching a football game when a call is received at his captioned telephone device that is located in his bedroom, the assisted user has to get up and move to his bedroom to field the call.

While movement to the location of a single captioned telephone device is simply inconvenient for some assisted users, in other cases the task of quickly travelling to a caption device when a call is received is exacerbated by other physical limitations. For instance, many assisted users are elderly and may have difficulty quickly getting up from a chair and moving to the captioned telephone location. Thus, here, when a call is received and an assisted user is sitting on a couch watching a football game, the user may not be physically able to field the call quickly causing the caller to hang up. Even when a call is received and an assisted user is able to travel to the captioned telephone to answer the call, as in the case of unassisted hearing users, an assisted user may be extremely disappointed when an incoming call is answered (e.g., in the case of a telemarketing call, a call from an acquaintance that the assisted user does not want to talk to when the call is received, etc.). Here, the act of getting up and travelling to the captioned telephone to field what ends up being an unwanted call is disappointing.

In addition to the cost of a captioned telephone limiting the caption service to one location in an assisted user's home, the cost typically results in the assisted user not having access to a captioned telephone at her office or place of work. Clearly, a hearing impaired person that benefits from a captioned telephone at home would also benefit from such a phone at her place of work.

One solution that can be used to provide captioning service at almost all locations has been to provide captioning via a smart phone or other portable device that includes a cellular or other type of communication connection. Here, a smart phone that can present text graphically on a display screen may be used in conjunction with other phone hardware to provide near simultaneous voice and text to an assisted user.

While the portable smart phone or other device enables captioning at virtually any location, this solution also has several shortcomings. First, this solution requires an assisted user to own a portable smart phone or similar device and to maintain a cellular voice and data plan which can be prohibitively expensive for many people. Second, currently available portable smart phone devices have relatively poor audio components so that a hearing user's broadcast voice signal is often times too quiet or of poor quality which exacerbates the hearing problem for many hearing assisted users. Third, the display screens on many cell phones and other portable devices are often times relatively small and therefore not optimal for use by an assisted user that may require large font. Fourth, where a cell phone or other portable device is used instead of a specialized captioned telephone device (e.g., a device with large screen, high quality loud speakers, etc.), the assisted user does not have the option to switch over use to a specialized captioned telephone when that option is preferred.

Thus, there is a need for a captioning solution which enables hearing impaired assisted users to obtain captioning of a hearing user's voice signals at various locations within a home, office, or other work environment without requiring a cellular voice and data plan. In at least some embodiments it would also be advantageous if the solution would allow an assisted user to use a captioned telephone device when preferred.

SUMMARY OF THE DISCLOSURE

It has been recognized that many captioned telephone device users or other persons that would benefit from captioned telephone services already have access to devices that could be used to extend captioned telephone service to locations that are remote from a typical captioned telephone device. To this end, a smart phone, portable tablet type computing device, wrist mounted device, laptop or other portable computing device that includes a displays screen (hereinafter the assisted user's "portable device") may be linked into a captioned telephone communication network and used to present text and a hearing user's voice to an assisted user as well as to obtain the assisted user's voice and provide the assisted user's voice to the communication network to be sent to a linked hearing user. More specifically, an assisted user's captioned telephone device may be linked to a home or office intranet and the assisted user's portable device may be wirelessly linked to the home or office intranet or other WIFI system (hereinafter a "WIFI system"). Here, the assisted user's captioned telephone device operates as a cordless caption phone (CCP) host device and the user's portable device operates as a CCP client device. When the host device receives an incoming call, in addition to generating an in-coming call indication (e.g., generating an audible ring, illuminating an in-coming call light device, providing caller ID information on a host device display screen), the host device may wirelessly link via a home or office WIFI system to the client device and cause the client device to generate similar warning signals (e.g., sound, light, caller ID information, etc.). In addition, the client device may present a call answer icon or virtual control button via a client device display screen which, when selected, causes the host device to answer the in-coming call and commence a caption service.

Here, if an assisted user uses the host device to answer an in-coming call on a first communication line in the usual fashion (e.g., by picking up a host device receiver and without using a client device), the host device operates in a normal fashion. To this end, first, the host device goes off hook to create a link on a first communication line to the hearing user's device (e.g., the device used to initiate the call). Second, the host device links to a relay via a second communication line either automatically or when an assisted user affirmatively requests caption service. The hearing user's voice signal received on the first line is transmitted to the relay on the second line to be converted into text and the text is received back on the second line and presented on a host display screen. In addition, the hearing user's voice is broadcast to the assisted user via a speaker included in the host device. A host device microphone receives words spoken by the assisted user and transmits those words on the first line to the hearing user's device to be broadcast to the hearing user.

In the alternative, if an assisted user answers an in-coming call using a CCP client device (e.g., a tablet, smart phone or other portable device), the act of answering the call causes the client device to transmit a call answer signal to the host device via the WIFI system which causes the host device to go off hook to create a link on a first communication line to the hearing user's device (e.g., the device used to initiate the call). Next, the host device links to a relay via a second communication line either automatically or when the assisted user affirmatively requests caption service via the client device (e.g., via selection of a "Caption" icon presented on a client device display screen). Once captioning is to commence, the hearing user's voice signal received on the first line is transmitted to the relay on the second line to be converted into text and the text is received back on the second line at the host device. The host device transmits the received text along with the hearing user's voice signals to the assisted user's client device (e.g., the tablet) via the WIFI system. The client device presents the received text to the assisted user to be viewed and also broadcasts the hearing user's voice to the assisted user via a client device speaker. A client device microphone receives words spoken by the assisted user and transmits those words via the WIFI system to the host device which transmits those words on to the hearing user's device via the first line to be broadcast to the hearing user.

In addition to being used to field in-coming calls, a CCP client and a CCP host system may be used to place outgoing calls. To this end, for instance, an assisted user may use a client device to link to a host device via a WIFI system and to control the host device to initiate a call to a hearing user's device. When a call is commenced, the host device links to a hearing user's device via a first line and after the first link is made (or at least after the call is commenced), the host device links to a relay via a second line to present hearing user voice signals to the relay to be converted into text. The text and hearing user's voice are transmitted via WIFI to the client device and presented to the assisted user and the assisted user's voice signal is transmitted from the client device to the host device and then on to the hearing user's device.

In other embodiments it is contemplated that a host device will present captions via a host device display screen even if a client device is simultaneously being used to present captions. In this way, if an assisted user travels from a remote location to a host device during an ongoing call, the assisted user can simply commence using the host device display screen to read captions during the call. This may be advantageous in cases where an assisted user prefers using a host device during captioning because the device includes a relatively larger screen, includes better speakers, is capable of a relatively louder broadcast of the hearing user's voice signal, has adjustable sound characteristics (e.g., pitch and tones) that can be customized to a user's preferences and hearing capabilities, etc. In this case, some assisted user's may simply use a client device to field calls after which the user would routinely move to the host device to participate in an ongoing call. Here, even after viewing captions on the host device, if an assisted user wants to move to a different location, the assisted user can simply use the client device to follow along with the captions while traveling once at a remote location.

In some embodiments captions may only be provided via one or the other of a host captioned device and an assisted user's client device at a time. For instance, where an assisted user answers an incoming call using the client device, captions may be presented on that device along with a "Change Device" button or selectable virtual icon. Here, when the Change Device button is selected on the client device, the host captioned device may start presenting text along with another "Change Device" button or icon and the client device may stop presenting text. At this point, if the Change Device button is selected via the host device, the client device may again start to present text along with a Change Device button and the host may cease presenting the text.

In most cases only one or the other of the host and a client device will present audio output of a hearing user's voice so that the audio is only presented once. In this way, an assisted user is not confused by presenting audio two times where the audio is not precisely synced in time which would result in an annoying echo of the hearing user's voice signal.

In some cases a client device may be linkable to other devices that enhance a caption call such as a Bluetooth headset or a high quality wireless speaker or set of speakers tuned to be optimized based on an assisted user's hearing capabilities. Hear, during a commissioning procedure, the client device may cause a pre-recorded voice loop to be played via the wireless speakers and present an interface via the client device screen that allows the user to adjust tone and pitch as well as perhaps other sound characteristics so that the assisted user can play with the characteristic settings until optimized values are set. Thereafter, the user's settings may be used to optimize during any subsequent caption calls. Other devices that may be linked to via a client device to enhance a call include a neck loop, a hearing aid, or cochlear implant, etc.

In other embodiments, if an assisted user is using a client device to participate in a caption call and the assisted user picks up a host device receiver, the host device may start presenting captions via the host device display either instead of or in parallel with the client device.

In at least some embodiments it is contemplated that a captioning application may be downloaded to any CCP client device which can be used to perform the various functions required at the client device. Once the application is downloaded to the client device, a commissioning process associated with the application may be performed to associate the client device and specifically the captioning application with the host device. Thereafter, when a call is received at the host device, if the client device is located within a range of the host device of an associated wireless network, the host device links to the client device and communicates therewith as described above. Similarly, after the client and host devices are associated, when the client device is used to initiate a call via the captioning application and the host device, the client device links via a WIFI system to the host device and the host and client devices communicate as described above.

It has also been recognized that other communication devices within an assisted user's environment are suitable for presenting captioning to an assisted user during a caption call. For instance, many televisions now include WIFI transceivers and allow a user to download various applications to a television based memory that can be run by a television based processor. Here, a captioning application can be downloaded to a suitable television device and may be associated with a host device during a commissioning procedure after which the television device operates in a fashion similar to that described above with respect to the tablet based client device. Here, the television may need to be supplemented with some other devices such as, for instance, a microphone and/or high quality speakers. In other cases a laptop computer or other computing device that has wireless communication capabilities, a display screen, a speaker and a microphone may operate as a client device.

In some cases, other pre-existing hardware may be useable with a television to facilitate communication. For instance, some companies are now manufacturing hardware devices that link to televisions for receiving wireless information for driving the linked television and in some of these cases a microphone is provided along with the devices. For example, the new Apple TV device includes a remote control that includes a microphone. Here, the microphone included with the remote may be used by an assisted user to generate a voice signal intended for a hearing user. The voice signal would be provided to the linked hardware device which would then be wirelessly transmitted to the host device and on to the hearing user's device.

In at least some cases two or more client devices may be associated with a single host device. For instance, an assisted user may download a captioning application to each of a portable tablet device and a large screen television device located in the user's living room and may associate each of the tablet and television devices with a host device in the user's kitchen. Thereafter, when an in-coming call is received at the host device, the host device may use the WIFI system to send messages to each of the tablet and television devices indicating the incoming call and an assisted user may be able to use either of those devices to answer the call and start a caption session.

In some cases where two or more client devices are associated with a host device, one of the client devices may handle a first subset of communication tasks while the other handles a second subset of communication tasks. For instance, where both a large flat screen television and a tablet are associated with one host, text may be presented via the large television display and an audio portion of a communication may be handled via the tablet that includes speakers and a microphone. For instance, here, when an incoming call is received, the tablet may indicate the incoming call and allow a user to accept the call by selecting an on screen virtual icon. Once the call is answered and captioning commences, the host may link to the television and present captions on the television screen and may maintain a link to the tablet to receive an assisted user's voice signal and to provide the hearing user's voice signal to the assisted user via broadcast using a tablet speaker. As another instance wireless speakers may be associated with a host device and driven directly by the host device while a tablet or television display presents captions. Communication preferences may be set up by an assisted user or a proxy (e.g., a family member) therefore during a device commissioning procedure.

In other cases it is contemplated that a host device will only associate with one client device and the client device may then be linkable to other affordances (e.g., a large television display, wireless speakers, a wireless microphone, etc.) via Bluetooth or some other wireless communication protocol.

In still other embodiments it is contemplated that a simplified host device may be provided that does not include any of the human interface features of a typical captioned device like a display screen, a speaker, a microphone for receiving an assisted user's voice signals, etc. Here, the host device would simply operate as an intermediate device for controlling call information routing during in-coming and outgoing calls between a hearing user's device, a relay and a portable client device. In effect, the portable client device would operate as the only caption output and hearing user voice signal output device to the assisted user and as the only device for obtaining a voice signal from the assisted user.

Many captioned telephone host devices that are already installed have all of the hardware required to facilitate client device enhanced services as described above. In these cases it is contemplated that installed host devices may be "retrofitted" by simply updating software on those devices so that those devices operate with portable personal client devices as described above. In this way existing hardware including existing portable client devices may be leveraged to provide additional functionality without substantial additional expense.

U.S. Pat. No. 8,917,821 which is titled "Device Independent Text Captioned Telephone Service" and which issued on Dec. 23, 2014 is incorporated herein in its entirety by reference and describes a system where a computer or other networked device can provide host type captioning services. In at least some embodiments it is contemplated that a desktop or laptop computer may be used with a tablet or other wirelessly linked client device to provide enhanced portable device captioning services like those described above in the context of a captioned telephone device.

DETAILED DESCRIPTION OF THE DISCLOSURE

Figure 1:
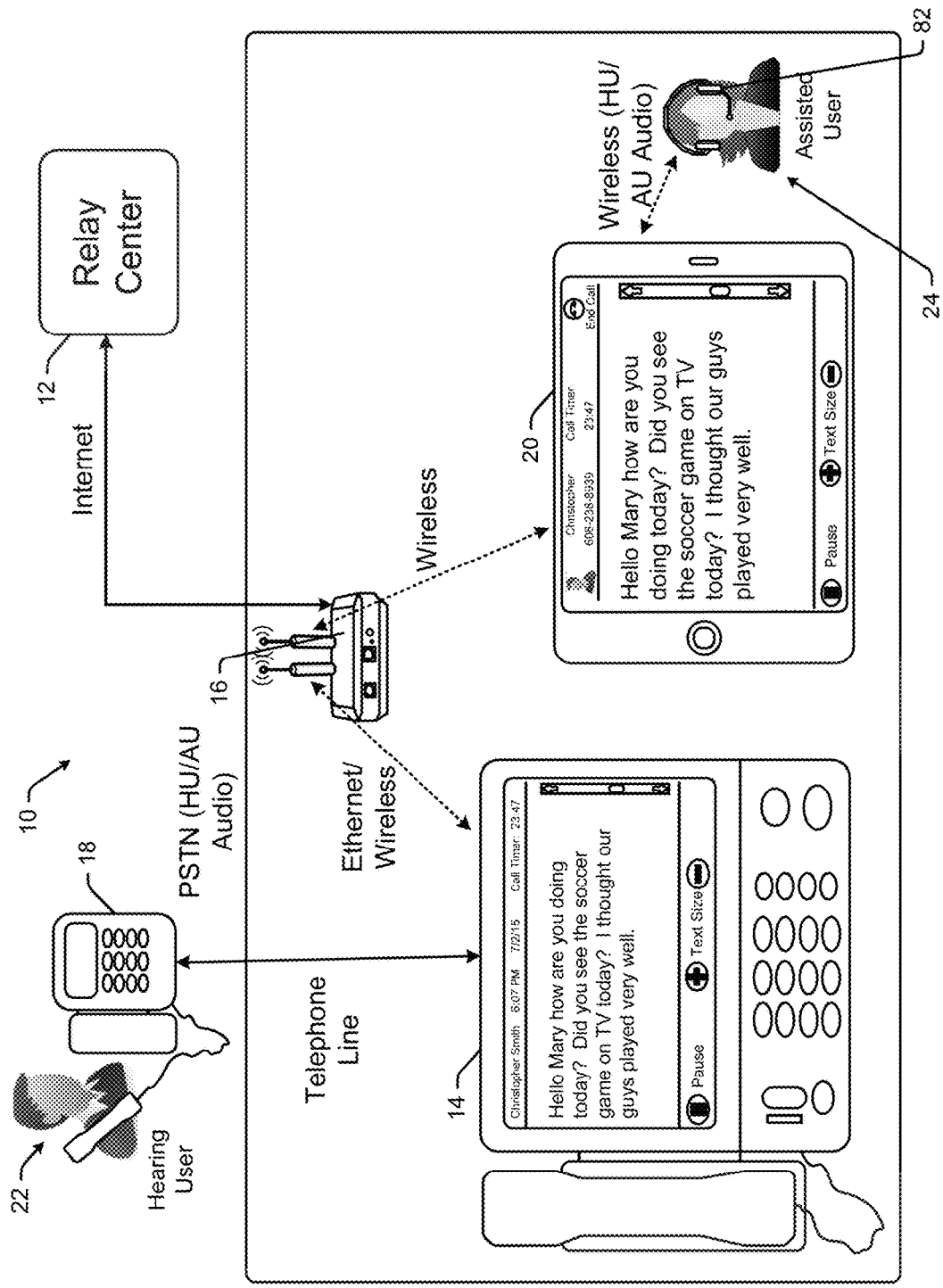
FIG. 1 is a depiction of an exemplary communication system that can be used to facilitate communication between a hearing user and an assisted user.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary communication system 10 that can be used to facilitate communication between a hearing user 22 and an assisted user 24 (e.g., a hearing impaired user) where the communication is similar to the type of communication that occurs between two hearing persons via a telephone connection. The hearing user 22 may use a normal telephone to link into the system via a PSTN or other type of telephone line or communication link to make a call or receive a call from the assisted user 24.

Exemplary system 10 includes a captioned telephone device 14, a wireless router device 16 and a tablet type computing device 20 located at the residence or some other location (e.g., an office, place or work, etc.) associated with assisted user 24 and within wireless broadcast range of router 16. In addition, system 10 includes a relay or call center 12 that is typically remote from the location at which router 16 is located.

In at least some embodiments, captioned telephone device 14 is a two line type caption device that is linkable by phone (e.g., PSTN) or other communication link (e.g., internet) on a first line to the hearing user's device 18. In at least some embodiments device 14 may be used like a normal telephone device to facilitate a conventional telephone conversation between two hearing users, one using device 18 and the other using device 14. To this end, referring also to FIG. 2, device 14 includes, among other components, a keyboard 32 for entering a phone number or other information and a handset 34 that can be used to receive a hearing user's voice broadcast from a speaker and to receive a local user's voice signals via a microphone built into the handset (not separately labeled). In at least some embodiments, while not illustrated, device 14 includes a speaker and a microphone that can be used to broadcast a hearing user's voice signal and to receive an assisted user's voice signal to be transmitted on to the hearing user at device 18. In some cases the speaker can be set to have a relatively high volume to help an assisted user hear the hearing user's voice signal. Voice signal attributes other than volume can be adjusted to increase a specific user's ability to hear (e.g., attributes like pitch and tone can be adjusted to meet specific and instantaneous user preferences).

Figure 2:
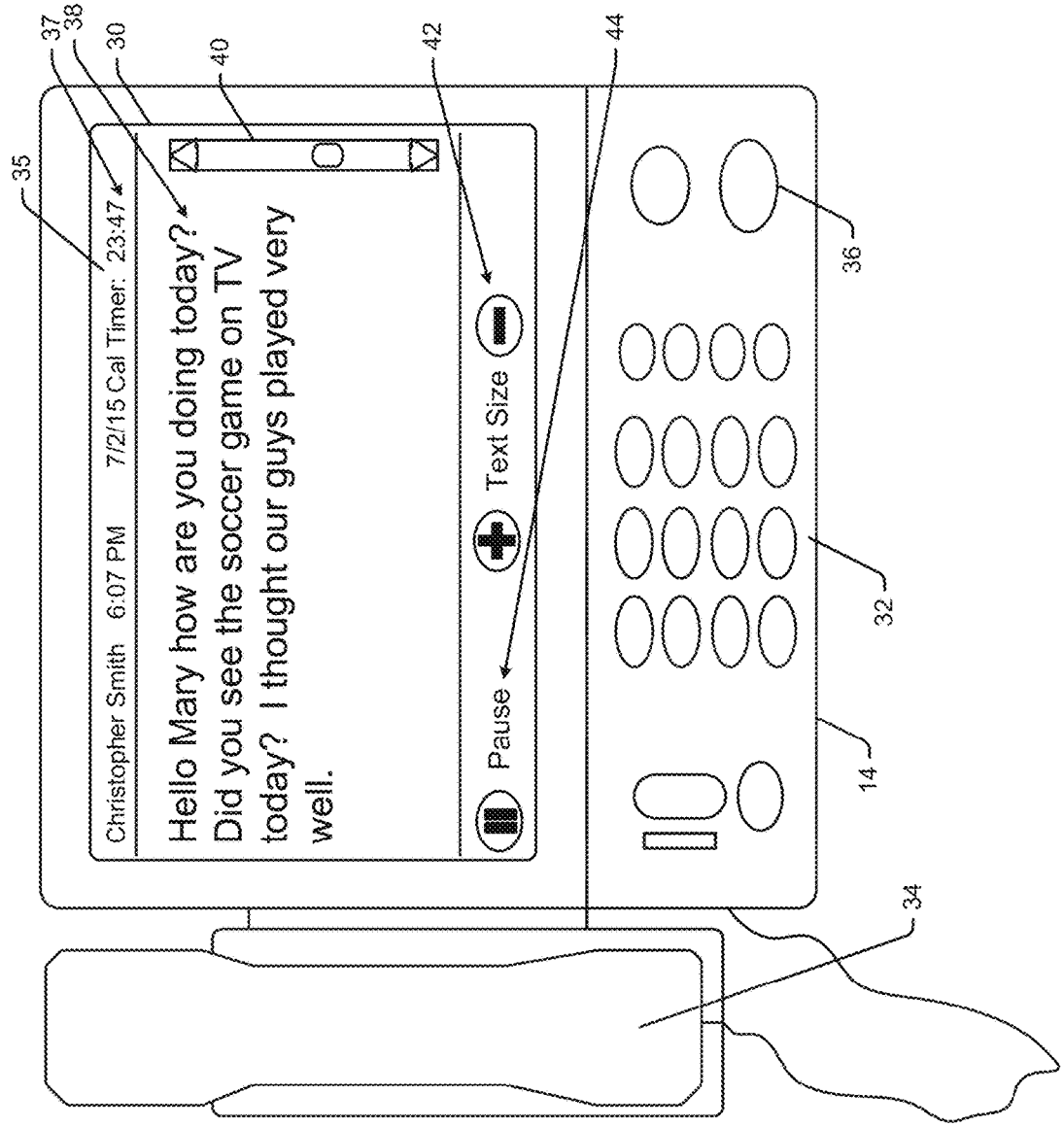
FIG. 2 is a depiction of a captioned telephone device.

Referring still to FIG. 2, in addition to the components described above, captioned telephone device 14 also includes a large (e.g., 7 to 9 inch diameter) display screen 30 which can be used to interface with device 14 by providing screen shots of content and virtual tools (see 35, 44, 42, etc.) as well as to provide text or captioning corresponding to words spoken by a remote hearing user 22 to an assisted user using device 14. To this end, see the exemplary caption text at 38 that corresponds to words spoken by hearing user 22 in the present example. The text is presented substantially in real time (e.g., with less than 1-4 seconds delay in most cases and often times faster) as a remote hearing user speaks. The exemplary display screen shot 35 in FIG. 2 includes additional useful information including a header at 37 which indicates the identity of the remote user 22 when available as well as a current time and date and a call timer which indicates the period associated with an ongoing call in minutes and seconds.

In at least some cases the screen 30 is touch sensitive so that virtual control icons or buttons can be presented on the screen and the screen can be used to sense when a user selects one of the virtual buttons. Exemplary virtual buttons include a scrolling tool at 40 enabling a user to scroll through content as that content is presented on the screen 30, a pause button 44 selectable to pause the captioning text service and a text resizing tool at 42 useable to increase or decrease the size of text presented in the captioned phrases at 38. In at least some cases the keyboard may include a special key 36 that is selectable to start and stop the captioning service at any time during an ongoing call or even prior to commencement of a call. For instance, while a conventional voice call is ongoing, an assisted user may recognize that she needs captioning as she cannot make out at least some words uttered by a hearing user. In this case, the user may select button 36 to start a captioning service. At some point while captioning is being provided during an ongoing call, a user may recognize that she does not need the captioned text and may select button 36 to turn off the captioning service.

Referring again to FIG. 1, device 14 has an Ethernet port or a wireless transceiver that can be used to link to a local area network router device 16 or some other intermediate device that in turn is linked to the router device. The router 16 is linked via an internet or other communication link to the relay center 12. When captioning is not required, device 14 is, in at least some cases, not linked to router 16 and instead conventional phone communications occur between a hearing user's device 18 and the assisted user's device 14. When captioning is required, device 14 links to router 16 and causes a connection to relay 12 over which the hearing user's voice signal is transmitted. Here, when device 14 is used without a remote tablet device 20, device 14 cancels an assisted user's voice signal from the voice signals transmitted to the relay 12 so that only the hearing user's voice signals arrive at the relay 12 to be converted to text. By cancelling the assisted user's voice from the signal sent to the relay, the relay can transcribe the entire received voice signal without attempting to separate the assisted user's voice from the hearing user's voice signal and the transcription process is rendered more simple.

Referring still to FIG. 1, relay center 12 comprises a system that can receive voice signals via the internet or other communication connection and transcribe the voice signals into text. In at least some cases, center 12 may employ call assistants or relay operators for transcribing voice signals to text. To this end, in at least some cases, each relay call assistant will be equipped with a computer having a display screen, a keyboard, a head set including an earphone and a microphone and perhaps other input devices. The computer may operate voice-to-text transcription software that is trained to the voice of the call assistant to transcribe voice signals from the call assistant to text. The hearing user's voice signal may be presented to the ear of the call assistant and the call assistant may revoice the hearing user's voice signal into the headset microphone. The computer then uses the transcription software to transcribe the call assistant's voice to text which is, in at least some cases, presented on the display screen linked to the call assistant's computer. The call assistant can then correct any transcription errors in the text presented on the display. The transcribed text is transmitted back to router 16 via the internet or other communication link which transmits the text on to device 14 to be displayed on screen 30. In at least some cases the transcribed text is transmitted to device 14 only after error correction has occurred. In other cases, the transcribed text is transmitted immediately upon generation by the software including errors and then any corrections to the transcribed text are subsequently transmitted and used to make in line or other corrections to the prior transmitted text so that transcription is presented to the assisted user as quickly as possible.

In other cases, instead of call assistants transcribing the hearing user's voice signal to text, automated transcription software running on a server or computer at relay 12 may receive a hearing user's voice signal and automatically transcribe that signal to text. Here, the automatically transcribed text may be sent immediately back to device 14 via the internet link to be presented via device 14. In other cases, a call assistant may correct the software transcribed text and corrections may either be made prior to transmitting the software transcribed text to device 14 or after that text is transmitted in which case the corrected text would be transmitted to device 14 and used to make in line or other types of corrections at device 14. In still other cases other combinations of automated transcription software and call assistant activities may be used at relay 12 to transcribe hearing user's voice to text. U.S. patent application Ser. No. 14/632,257 which is titled "Semi-automated Relay Method And Apparatus" and which was filed on Feb. 26, 2015 describes several different relay systems where software or a call assistant and software combination are used to transcribe a hearing user's voice to text, any of which may be used in system 10, which is incorporated herein in its entirety by reference.

Referring yet again to FIG. 1, consistent with that least some aspects of the present disclosure, an assisted user 24 may own or have access to a portable tablet or other type of portable computing device 20. Here, device 20 may be any type of portable computing device that includes a display screen, a wireless transceiver and a processor that is capable of performing the methods and processes described herein. For instance, device 20 may include a laptop computer, a tablet type computing device like an I-Pad, an Android based tablet device, etc., a smart phone or other type of computing device. Hereinafter, unless indicated otherwise, while device 20 may take many different forms, the phrase "tablet device" will be used to refer to device 20 or any other type of portable computing device used in a system 10.

Figure 3:
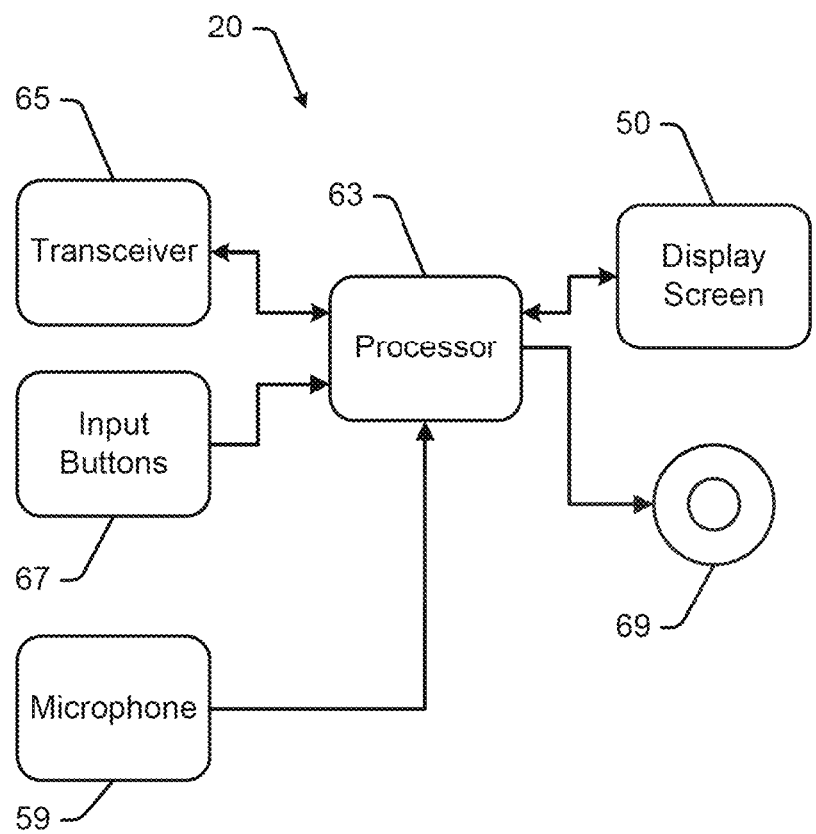
FIG. 3 depicts the components of a portable tablet or other type of portable computing device.
Figure 4:
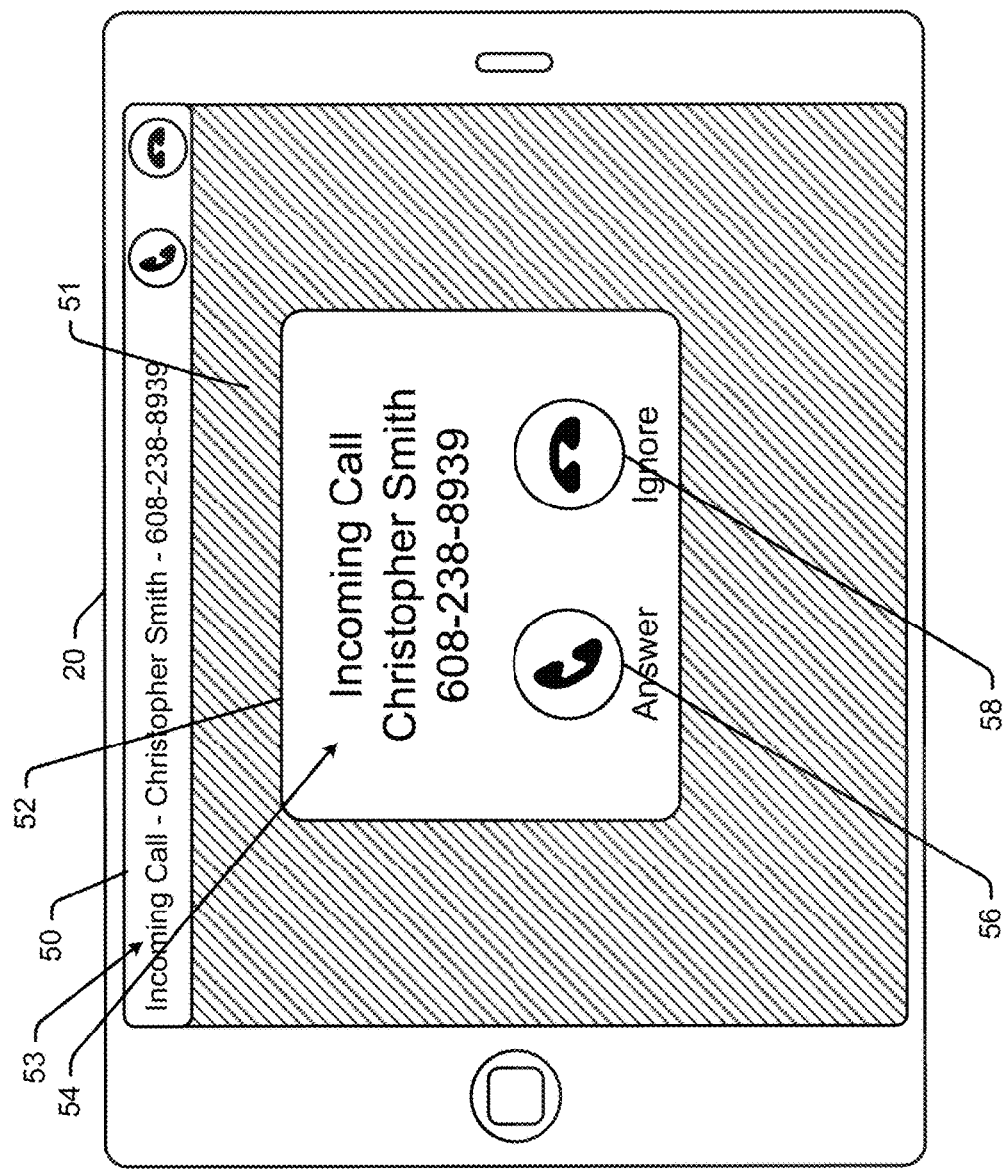
FIG. 4 is a depiction of a portable tablet or other type of portable computing device receiving an incoming call.

Referring to FIGS. 3 and 4, exemplary tablet device 20 is illustrated which includes, among other components, a touch sensitive display screen 50, a processor 63, a transceiver 65, one or more speakers 69, a microphone 59 and, in at least some cases, one or more hardware interface buttons 67. Processor 63 is linked to each of the screen 50, transceiver 65, buttons 67, microphone 59 and speaker 69. Wireless signals from router 16 are received via transceiver 65 and wireless signals are also transmitted from processor 63 to router 16 via transceiver 65. In addition, processor 63 can communicate with other wireless devices such as an assisted user's headset 82 (see also FIG. 1) that includes earphones and a microphone to transmit a hearing user's voice signal to and receive an assisted user's voice signal from device 82, a wireless speaker or microphone, etc.

As seen in FIG. 1, a wireless (e.g., WIFI) link may be established between router 16 and client device 20 so that device 20 can be networked to the captioned telephone device 14 as well as to relay 12. Here, client device 20 can be used as a wireless remote interface to captioned device 14 and, in at least some cases, may support substantially all or all of the assisted user interface input and output functionality that is provided by host device 14. Thus, for instance, when a call is received at captioned device 14, in addition to announcing the call at device 14 via a ring tone and some type of visual notice on screen 30 or a flashing light (not shown) associated with device 14, device 14 may transmit a signal to router 16 and on to client device 20 causing device 20 to announce the incoming call in a similar fashion. To this end, see, for instance, FIG. 4 where a screen shot 51 includes an announcement window at 52 indicating that an incoming call has been received by device 14. The announcement includes, where possible, the name of the remote hearing person calling device 14 and a phone number associated with the device 18 used to initiate the call (see 54 in FIG. 4). In addition, the announcement includes selectable virtual on screen icons or buttons 56 and 58 for answering the call and ignoring the call, respectively. Here, to answer an incoming call via device 20, a user simply selects icon 56 and to stop the announcement and end the call, the user simply selects icon 58.

In addition to announcing via window 52, device 20 may generate a ringing or other signal via speaker 69. In addition, device 20 may control the background of screen 50 that surrounds window 52 to clearly indicate an incoming call by, for instance, generating a red background color as indicated by the left up to right cross hatching shown in FIG. 4.

In other cases the incoming call notice may be more discrete such as a simple banner (see 53 in FIG. 4) at the top of the screen 50 to announce an incoming call. In still other cases device 20 may generate different types of incoming call announcements depending on how device 20 is currently being used by an assisted user. For instance, if the assisted user is currently using an application on device 20 for some other purpose (e.g., reading a news article, playing a game, etc.), a relatively discrete announcement like banner announcement 53 may be presented as the user, staring at the screen, should be able to notice the announcement when it arrives. Here, if the user is not currently using an application on device 20, the announcement may be less discrete such as the window form shown at 52 in FIG. 4 to more strongly call the user's attention to the incoming call. In at least some cases sensors already included in device 20 may be able to discern the type of notice to present as a function of immediate use by a device user. For instance, an accelerometer or other sensor in device 20 may sense when the device is being moved and may discern instantaneous use by a user therefrom. As another example, a camera in device 20 may obtain an image of the user when an incoming call is received and the device 20 processor 63 may analyze the image and determine that the user is looking directly at the screen 50 so that a more discrete banner or other type incoming call announcement can be generated.

When the device 20 user receives a call and selects icon 58 in FIG. 4 to ignore the call, device 20 transmits a signal via router 16 to host device 14 indicating that the user does not want to answer the call. In response to the received ignore signal, host device 14 may link the incoming call to a voice mail or call answering service. Here, the call answering service may answer the call, present a voice message to the calling party 22 and request that the calling party leave a voice mail message. When a voice mail message is provided, the voice signal may in some cases be stored solely as a voice mail message. In other cases, the voice mail message may be automatically presented to relay 12 and converted to text. The text may be transmitted back to device 14 to be stored locally along with the voice mail for subsequent access by the assisted user 82. In other cases the voice and transcribed text may be stored via a server at relay 12 to be accessed subsequently by user 24. In some cases where voice mail transcription is supported, transcription may occur immediately when a voice is recorded while in other cases the transcription may occur at some subsequent time as immediate transcription of a stored voice mail is not typically necessary (e.g., transcription 10 minutes after a hearing user's voice signal is recorded is usually acceptable).

Because transcription of a voice mail is typically not time sensitive, in at least some cases, voice to text transcription software may be used to generate an initial text version of a voice signal. Here, in some cases the initial text version may be presented to an assisted user when the user accesses the voice mail associated therewith. In some cases, if the initial version of the text is insufficient (e.g., clearly not accurate or includes excessive errors), the assisted user may request a more accurate version at which point the original voice signal may be presented to a call assistant at relay 12 for full call assistant transcription or at least for correction of the initial text version. Corrected or call assistant transcribed text may then be transmitted back to the assisted user device 14 or device 20 to be presented to the assisted user.

When device 20 user receives a call and selects answer icon 56 in FIG. 4, a signal is transmitted back through router 16 to captioned host device 14. The signal received at device 14 causes device 14 to initiate a link via router 16 to relay 12 to commence captioning in at least some embodiments. In addition, the signal received at device 14 causes device 14 to answer the incoming call (e.g., go off hook) and start transmitting voice signals between the hearing user's device 18 and the assisted user's tablet 20 via router 16. Here, the hearing user's voice signal received at device 14 is routed through router 16 to each of relay 12 and tablet 20. When the hearing user's voice signal is received at relay 12, the signal is converted to text and the text is transmitted back to device 14 via router 16. In at least some cases text received at device 14 will always be presented via device 14. In other cases where an assisted user is using device 20 to view text, the text will not be presented via device 14.

When device 14 receives text from relay 12 and an assisted user is using tablet 20 for captioning, device 14 transmits the received text via router 16 to device 20. Thus, device 20 receives both the hearing user's voice signal as well as the transcribed text associated with the hearing user's voice signal. Because it takes at least some time to transcribe the voice signal to text, the hearing user's voice signal is typically received at tablet 20 at least some time prior to receiving the text and therefore there is some delay between voice broadcast and text presentation by tablet 20. For this reason, in at least some cases device 14 or tablet 20 or even relay 12 in some cases may delay the voice signal for a short duration (e.g., 2 or less seconds) so that the text and associated voice signal are more synchronized. In still other cases it is contemplated that time stamps may be associated with incoming voice signals (e.g., a separate time stamp for each word discerned in a received voice signal) and text may be associated with each time stamp so that substantially precisely synchronized text and voice can be presented. Here, delays in voice and text presentation may be presented at the ends of sentences as opposed to between words so that the sentences make more sense and can be presented at the pace of the original utterances by the hearing user.

Voice signals from assisted user 24 received via microphone 59 are transmitted from tablet 20 via router 16 to device 14 and on to the hearing user's device 18 to be broadcast to the hearing user.

Figure 5:
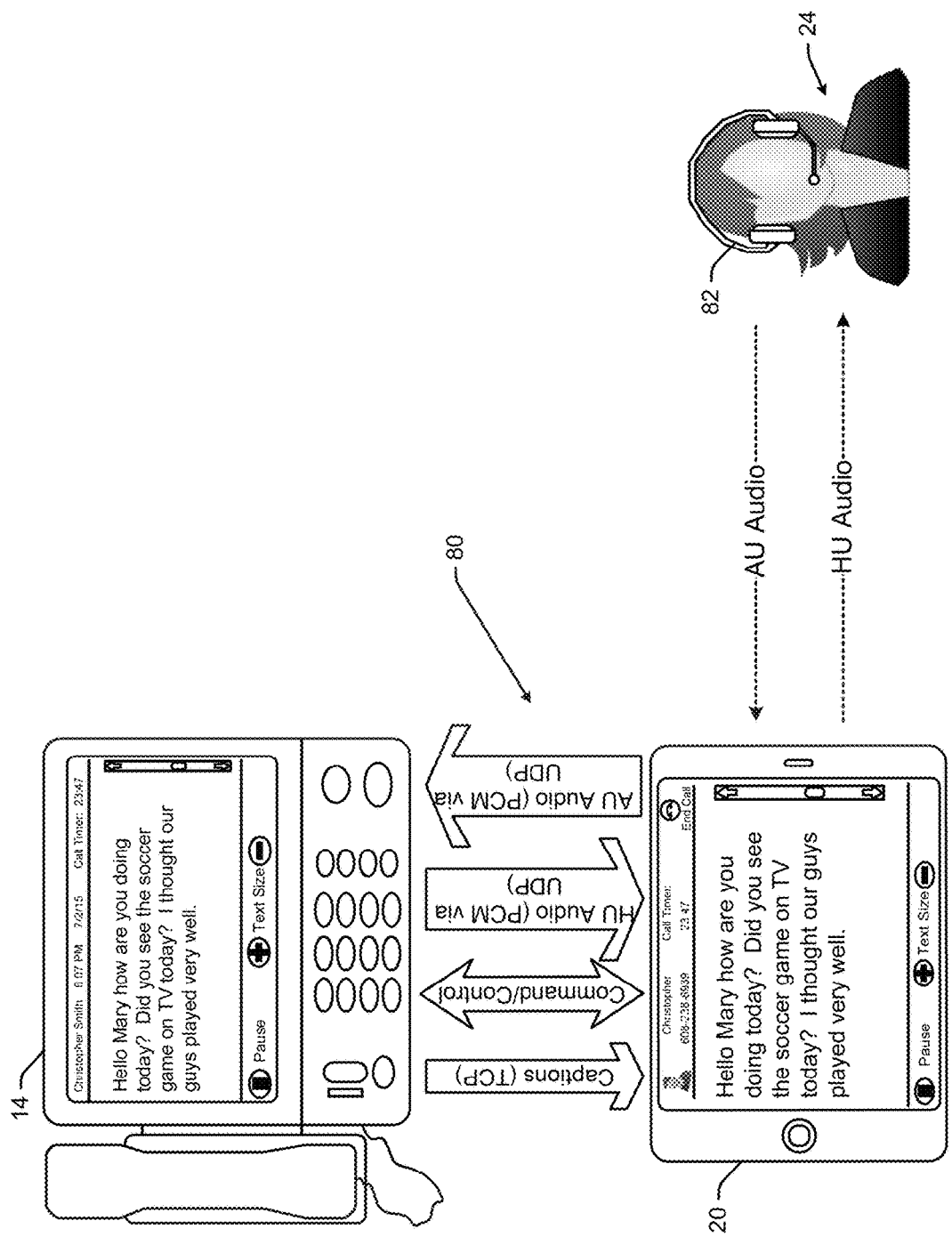
FIG. 5 is a depiction of exemplary data transfer between a captioned telephone device, a portable computing device, and an assisted user.

Thus, referring to FIG. 5, when client device 20 is used as a remote captioning device, an additional IP connection 80 via a home or business network (e.g., a router 16) is established to initiate a two way audio stream (e.g., PCM via UDP), one way captioning to device 20 via TCP (or some other suitable protocol) and two way command/control signal transmission between host device 14 and client device 20.

Referring yet again to FIG. 1, in at least some embodiments the assisted user 24 may use a wireless or tethered headset 82 including earphones and a microphone. In this case, the assisted user's voice signal would be obtained via the headset microphone and transmitted to tablet 20 to be forwarded on to device 14 and then on to the hearing user's device 18. The hearing user's voice signal would be transmitted from tablet 20 to the headset earphones to be broadcast to the assisted user. Text from relay 12 would still be presented via the tablet 20 display.

Figure 6:
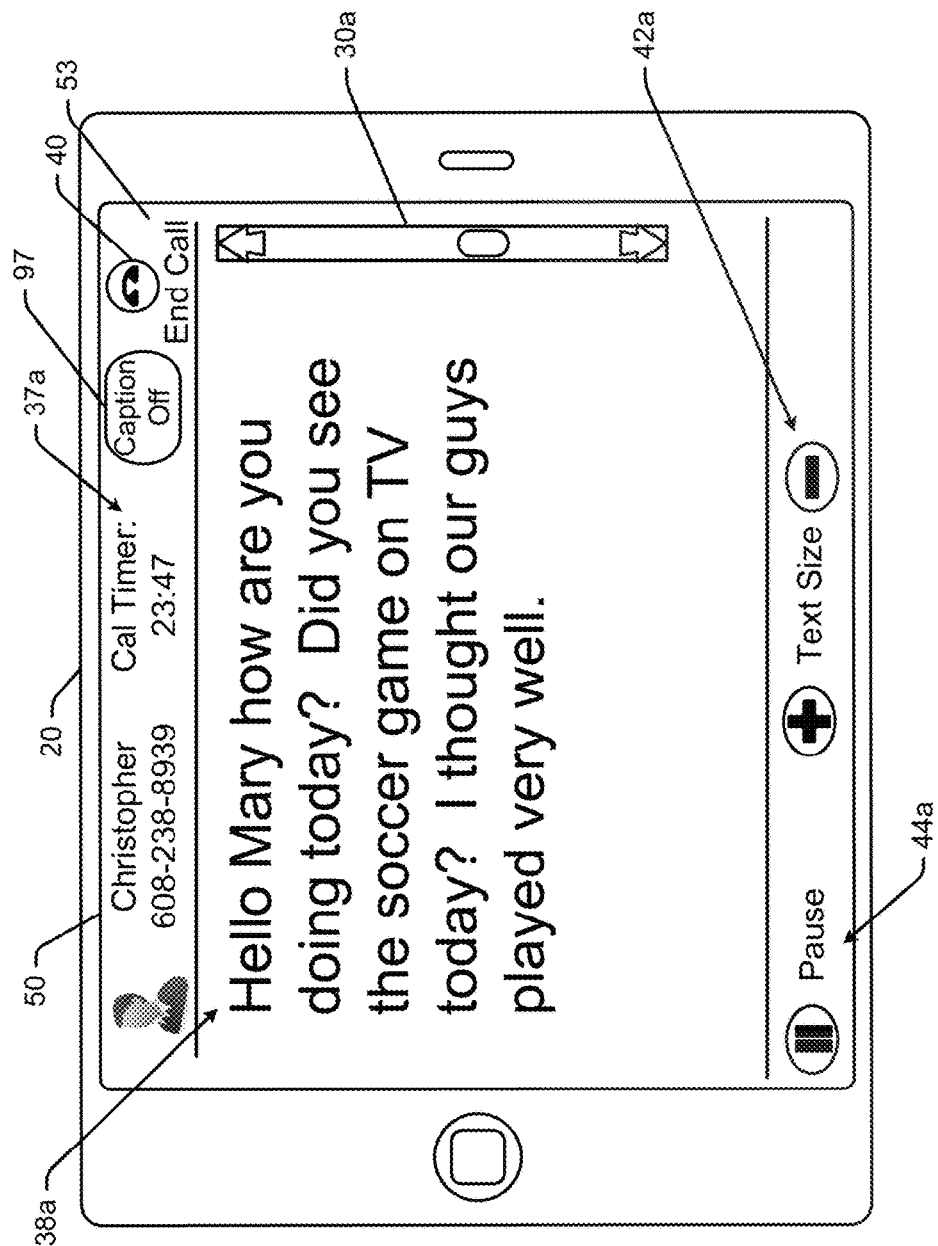
FIG. 6 is a depiction of a portable tablet or other type of portable computing device during ongoing captioning.

Referring now to FIG. 6, an exemplary screen shot that may be presented via tablet screen 50 during ongoing captioning is shown. The exemplary shot includes information and tools that are similar to the information presented via the captioned device screen shown in FIG. 2. To this end, information descriptive of an on going call is presented at 37a including the name of the hearing user participating in the call, the hearing user's telephone number and, where available, an image of the hearing user. Transcribed text is presented at 38a and a text scrolling tool is presented at 30a.

Pause and text size control icons are presented at 44a and 42a, respectively. Comparing the screen content in FIG. 6 with the content in FIG. 2, similar content is indicated by the same numerical label, albeit including an "a" qualifier in FIG. 6. By presenting content in a similar format and with a similar look and feel, user's familiar with the content presentation on the captioned device screen 30 will be automatically familiar with the similarly presented content on tablet screen 50.

Referring still to FIG. 6, in addition to the other information presented as described above, screen shot 77 also includes an "End Call" icon 40 for ending an ongoing call. When icon 40 is selected, tablet 20 may exit a captioning application immediately. In addition, upon ending a call, tablet 20 transmits a control signal to caption device 14 causing device 14 to terminate the telephone link to the hearing user's device 18 and terminate the link to relay 12.

Figure 7:
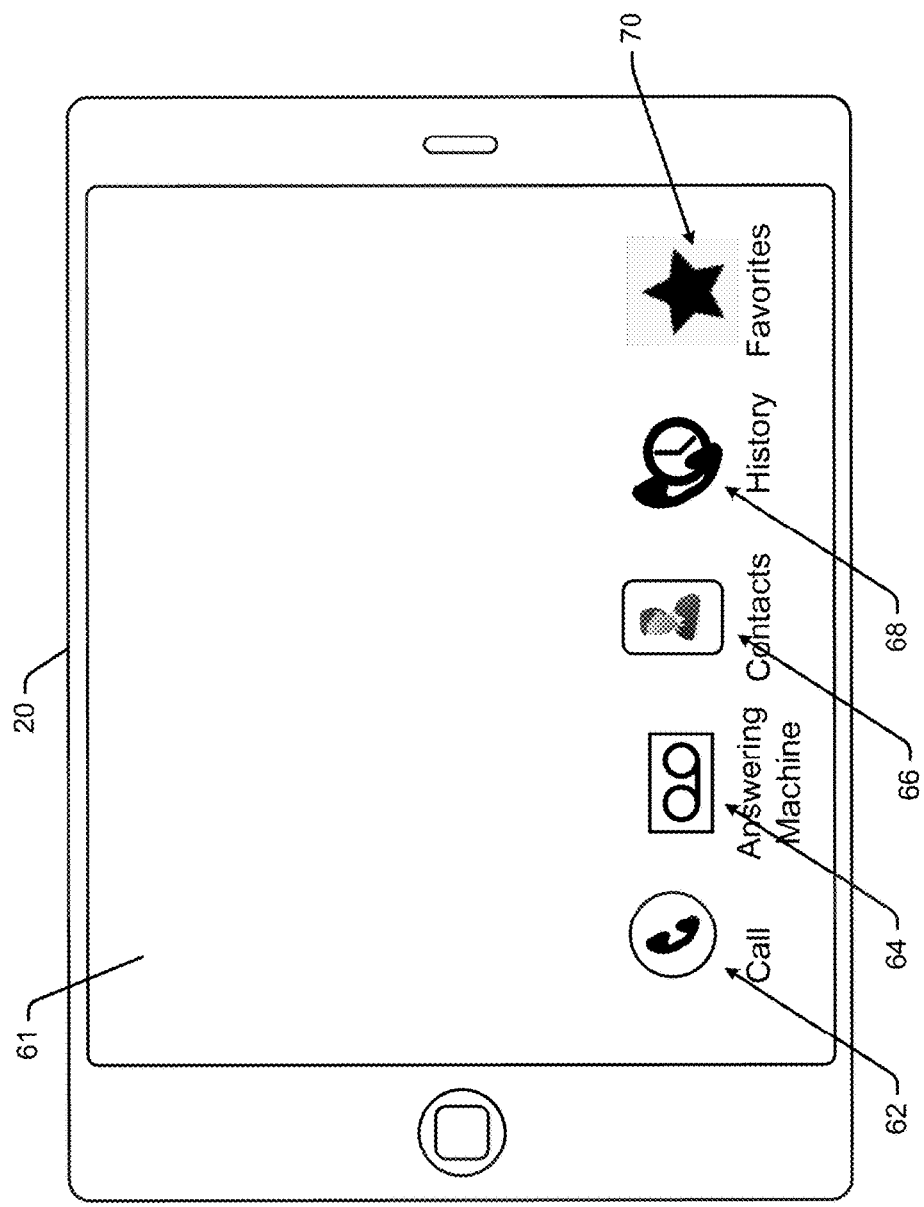
FIG. 7 is a depiction of a portable tablet or other type of portable device displaying an exemplary captioning application main screen shot that can be used to access different captioning application features.
Figure 8:
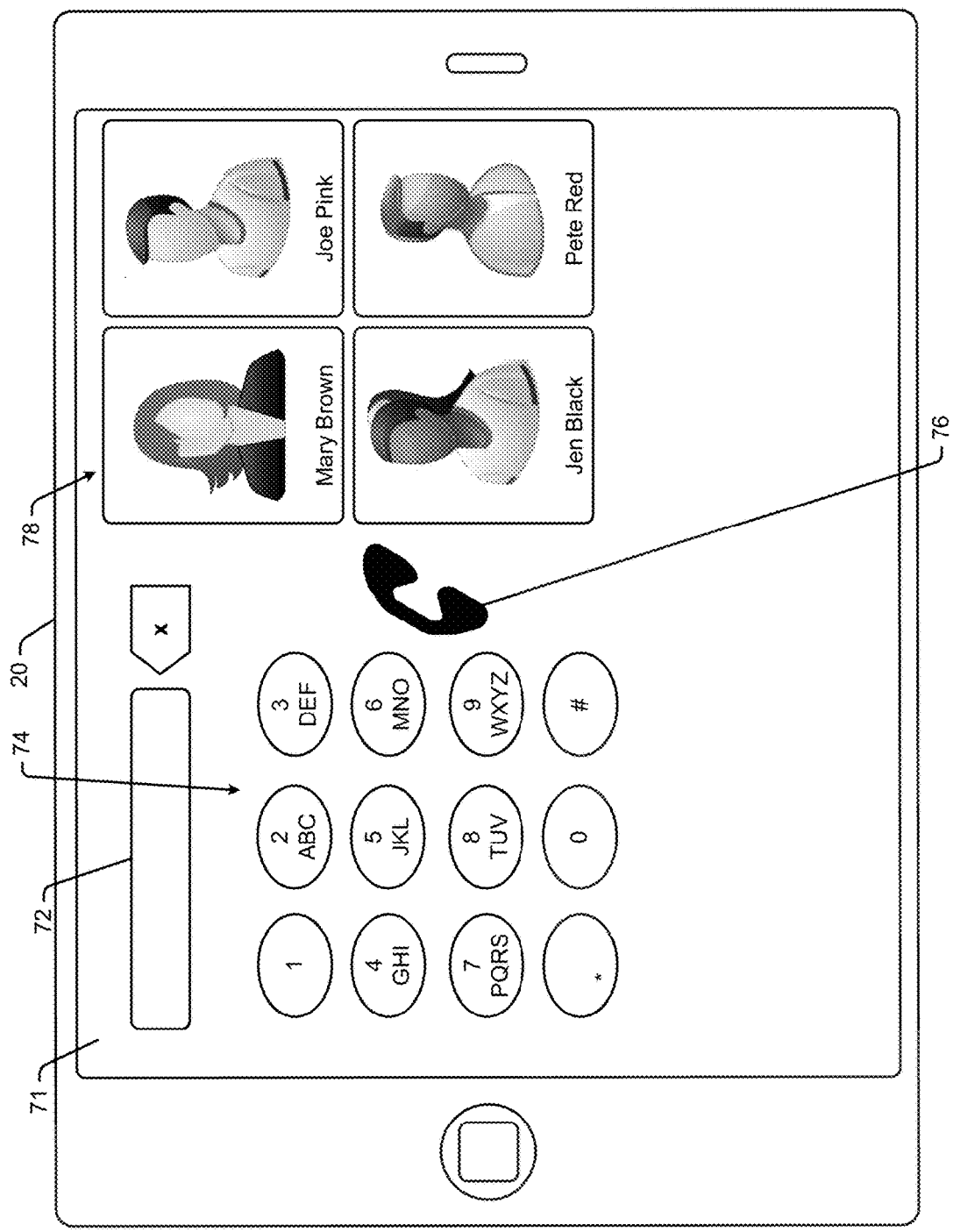
FIG. 8 is a depiction of the portable tablet or other type of portable device of FIG. 7 after a user selects the call option.

In addition to using tablet 20 to field an incoming call, tablet 20 may be used to place a call that provides captioning service. To this end, see FIG. 7 where an exemplary captioning application main screen shot 61 is shown that includes several different virtual control icons 62, 64, 66, 68 and 70 that can be used to access different captioning application features. Icon 62 is a "Call" icon which, when selected, allows an assisted user to initiate a captioned call to another person (e.g., the hearing user 22 in FIG. 1). For instance, when icon 62 is selected, in at least some embodiments the exemplary screen shot 71 shown in FIG. 8 may be presented. Exemplary screen shot 71 includes a field 72 and a virtual numeric keyboard 74 for entering a telephone number. In addition, in at least some cases contact information for other persons that the assisted user has previously stored or has recently communicated with may be presented as at 78. In FIG. 8 the exemplary contact information includes a name and image of teach of several different contacts. Any of the images may be selected to place an associated phone number in field 72 as an initial step to commencing an outgoing call. Other formats for presenting contact information 78 are contemplated. Once a number is entered into field 72, phone icon 76 may be selected to initiate a call.

Referring again to FIG. 1, to initiate a call, device 20 transmits a call request via router 16 to caption device 14. Upon receiving the call request, device 14 dials out on the telephone line to the target hearing user's device (e.g. the phone associated with the number entered or selected by the assisted user). In at least some cases if a hearing user answers an outgoing call, caption device 14 automatically controls router 16 to link to relay 12 to provide the hearing user's voice signal to relay 12 and to receive transcribed text back from relay 12 to be presented to the assisted user. The returned transcribed text received at device 14 is routed to tablet 20 via router 16 to be presented to the assisted user 24. Again, the call can be terminated by the assisted user at any time by selecting the end call icon 40 shown in FIG. 6.

Figure 9:
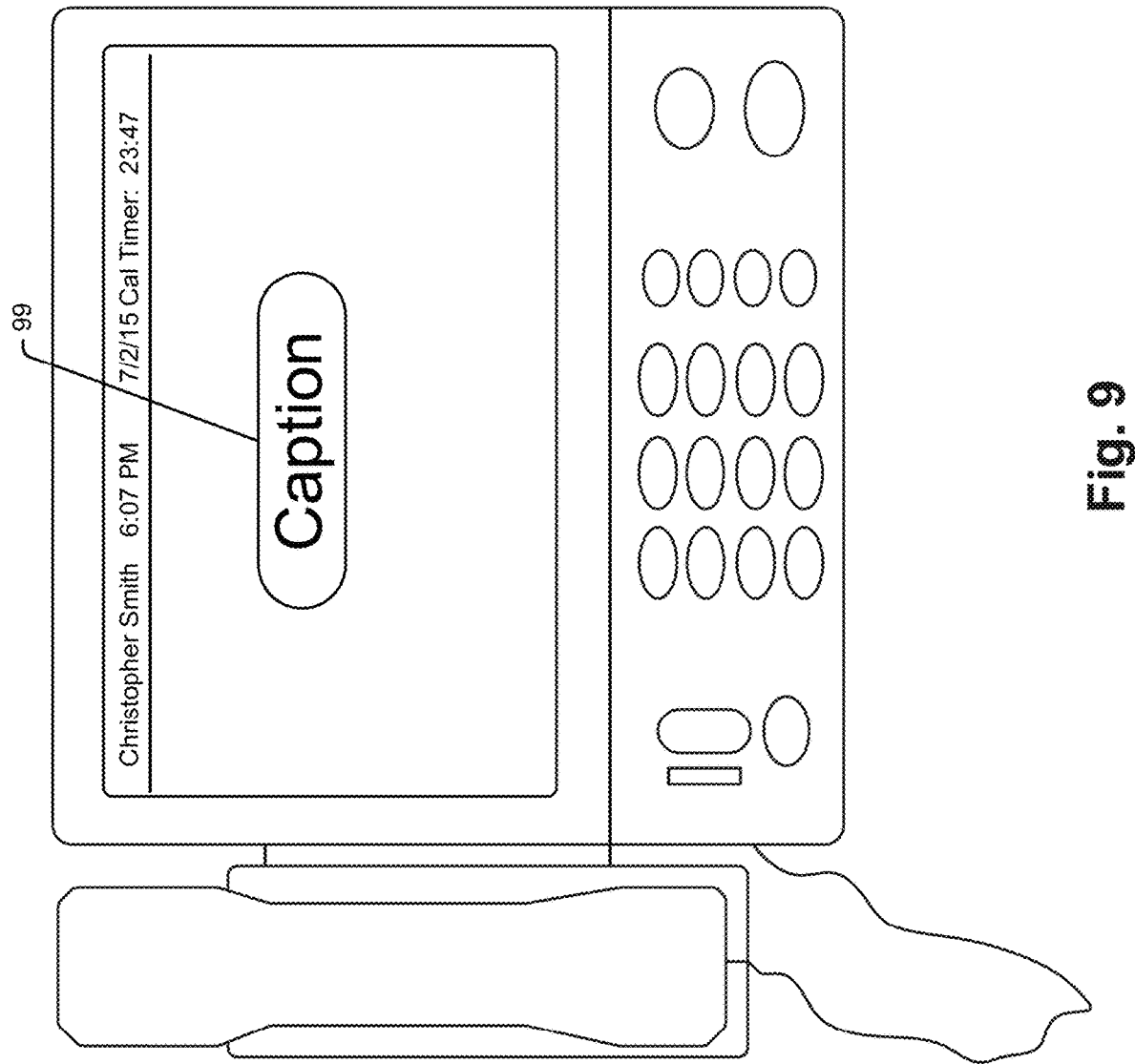
FIG. 9 is a depiction of the captioned telephone device of FIG. 2 in the middle of a call with captioning turned off.

Referring again to FIG. 7, answering machine icon 64 may be selected to access stored voice mails and associated transcribed text. In at least some embodiments voice mails and associated text may be stored in a database linked to host device 14 or accessible via router 16. History icon 68 may be selected to access a list of recent calls or call attempts to render those contacts easily accessible. Favorites icon 70 can be selected to access a list of an assisted user's favorite contacts for convenience. Contacts icon 66 may be selected to access stored contact information. In some cases the contact information is stored by a relay or other system server or device that is separate from portable tablet 20 so that selection of icon 66 causes In at least some cases it is contemplated that an assisted user will not need or want captioning when a call is initially answered but may want to turn on a captioning service at some time during an ongoing call. Nevertheless, in this case, the assisted user would often like the ability to answer an incoming call or initiate an outgoing call at a location remote from the host device 14. For this reason, in at least some cases, calls may be answered or initiated using client device 20 linked to host device 14 without captioning and the captioning may only be turned on at some subsequent time. To this end, if the answer icon 56 is selected in FIG. 4, at least initially, client device 20 may send a signal via router 16 to host device 14 to answer the call and start an audio only communication session while presenting a "Caption" icon option 99 as shown in FIG. 9. Here, as the audio only call is progressing, an assisted user may select icon 99 to cause host device 14 to link via router 16 to relay 12 to commence the captioning service. Again, text would be transmitted via router 16 to host device 14 and from host device 14 through the router 16 to the client device to be presented on the client device screen 50.

In other cases, when a tablet 20 is paired with or associated with a caption device 14, device 14 may tag a hearing user's voice signal with a virtual ID associated with tablet 20 so that when text is transmitted back from relay 12 to be presented to the assisted user, the text can be sent through the router 16 directly to tablet 20 via virtual ID associated therewith without having to first be received at the host device 14. In this case, the text may or may not be transmitted to device 14 and may or may not be presented via device 14 even if transmitted thereto. Thus, for instance, when a call is received at device 14, an incoming call announcement (see 52 in FIG. 4) may be presented via device 20 and when answered, device 14 may link to relay 12 to start the captioning process. Here, the hearing user's voice is transmitted to relay 12 along with the assisted user's tablet virtual ID or address and relay transmits the transcribed text via the internet or other communication link through router 16 directly to tablet 20 to be presented via screen 50.

In still other cases, although not shown, the host device 14 may include a built in router so that the Ethernet/wireless link shown in FIG. 1 is not required. Here, host device 14 would simply link via the internet or other communication link to relay 12 and wirelessly to device 20 via a local area or wide area network.

Figure 10:
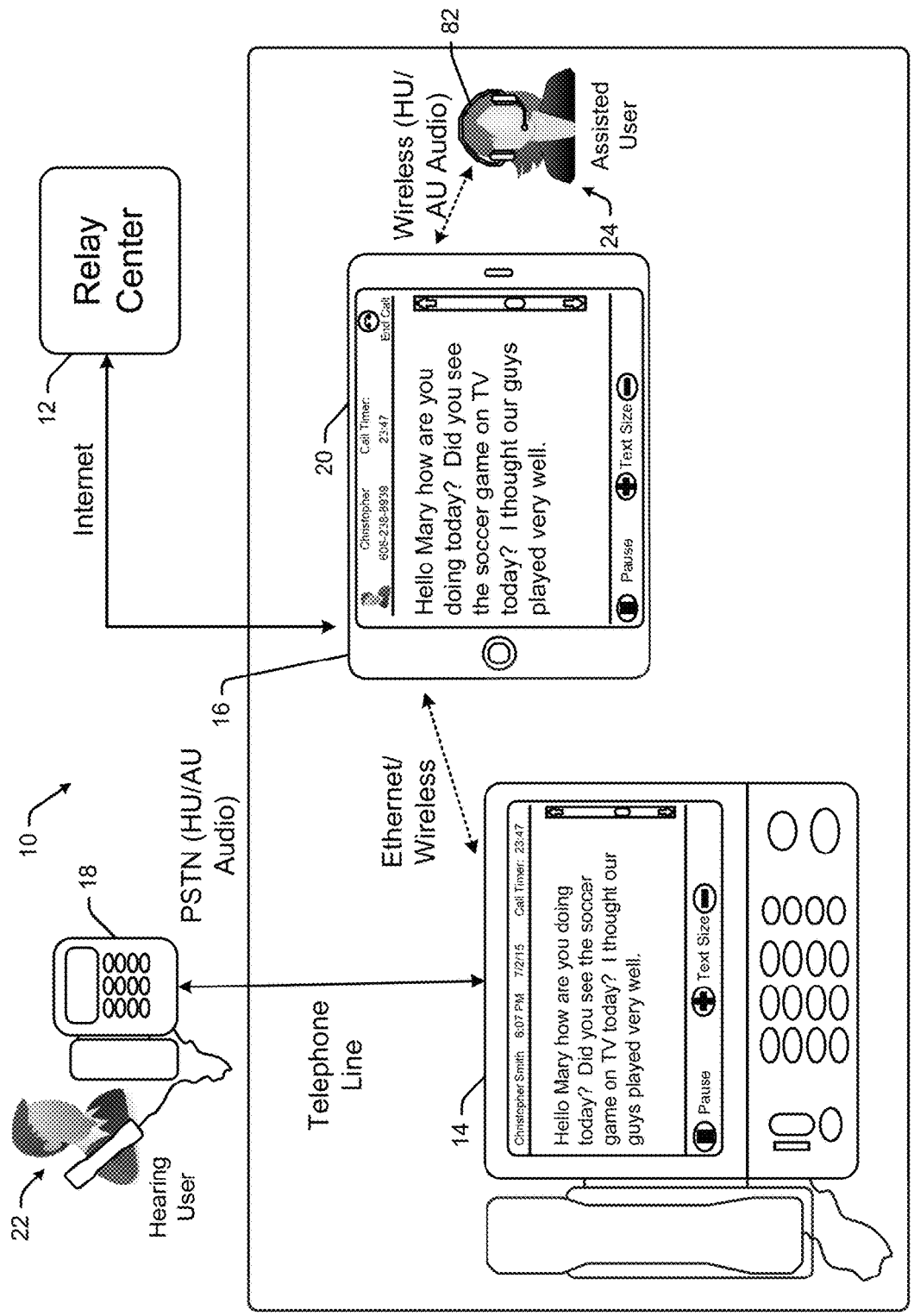
FIG. 10 is a depiction of a second exemplary communication system that can be used to facilitate communication between a hearing user and an assisted user.

In yet other cases device 20 may include a personal hotspot or other type of a router capability and router 16 may again not be needed. To this end, see FIG. 10 that is similar to FIG. 1, albeit where the router 16 is replaced by a router internal to device 20. In this case, when relay services are required and an assisted user is using a tablet or other portable device 20 with a built in routing capability, device 14 may provide the hearing user's voice signal to device 20 which in turn transmits that voice signal to relay 12 while also broadcasting that voice to the assisted user 24. Relay 12 again provides transcribed text which is transmitted to tablet 20 to be displayed on the tablet screen 50. The assisted user's voice signal in this case is also transmitted from tablet 20 to caption device 14 and then on to the hearing user's device 18. Here, if an assisted user wants to switch over to viewing captions on host device 20, the user may initiate that process which would in turn cause captions to also be presented via the host device display. Here, the phone link between the assisted user's host device and the hearing user's device is a direct phone, internet or other type of communication link while device 20 handles back end communication with relay center 12.

Figure 11:
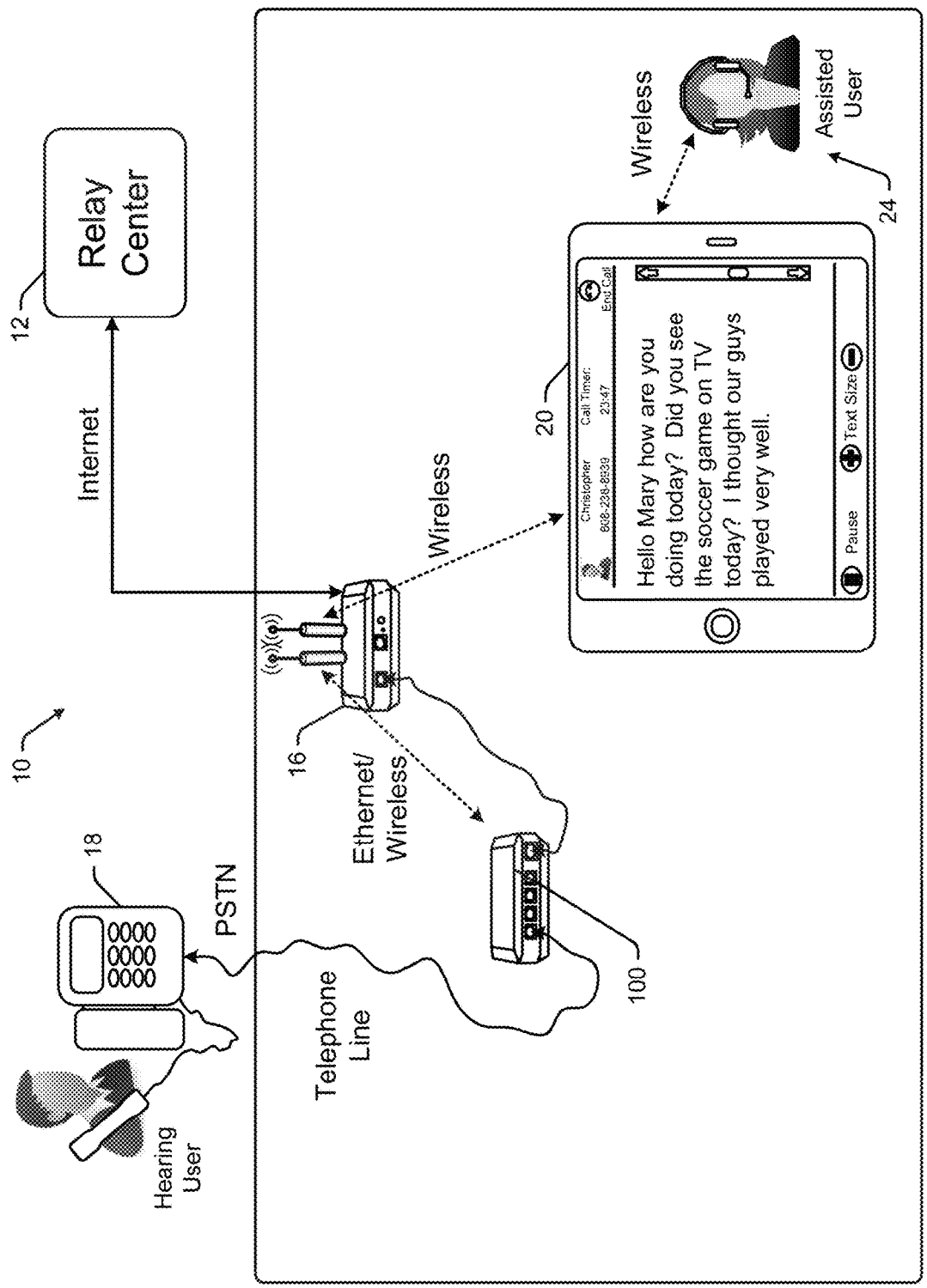
FIG. 11 is a depiction of a third exemplary communication system that can be used to facilitate communication between a hearing user and an assisted user.
Figure 12:
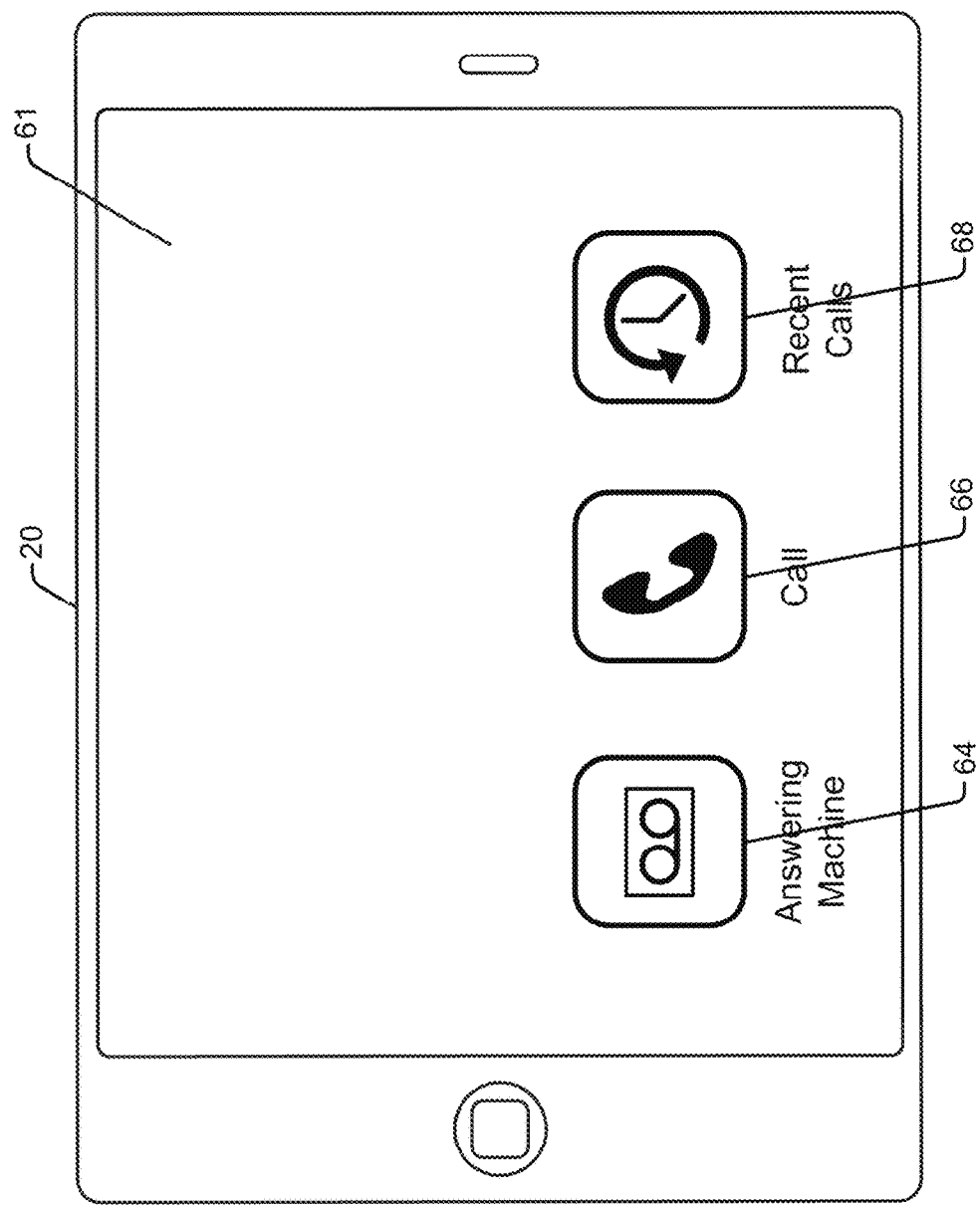
FIG. 12 is a depiction of another screenshot of a portable tablet or other type of portable computing device.
Figure 13:
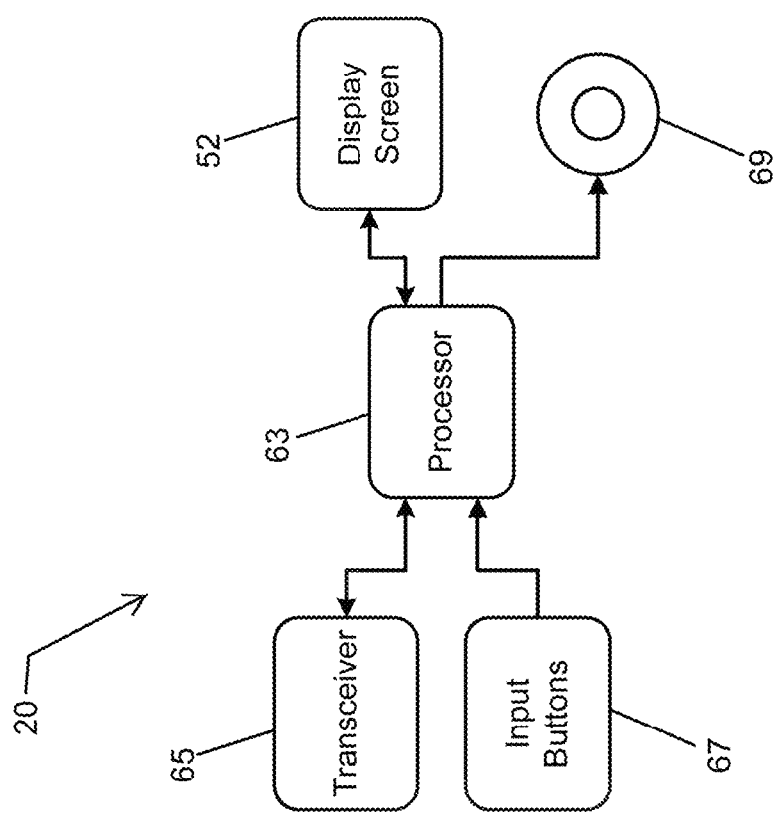
FIG. 13 depicts the components of a second portable tablet or other type of portable computing device.
Figure 14:
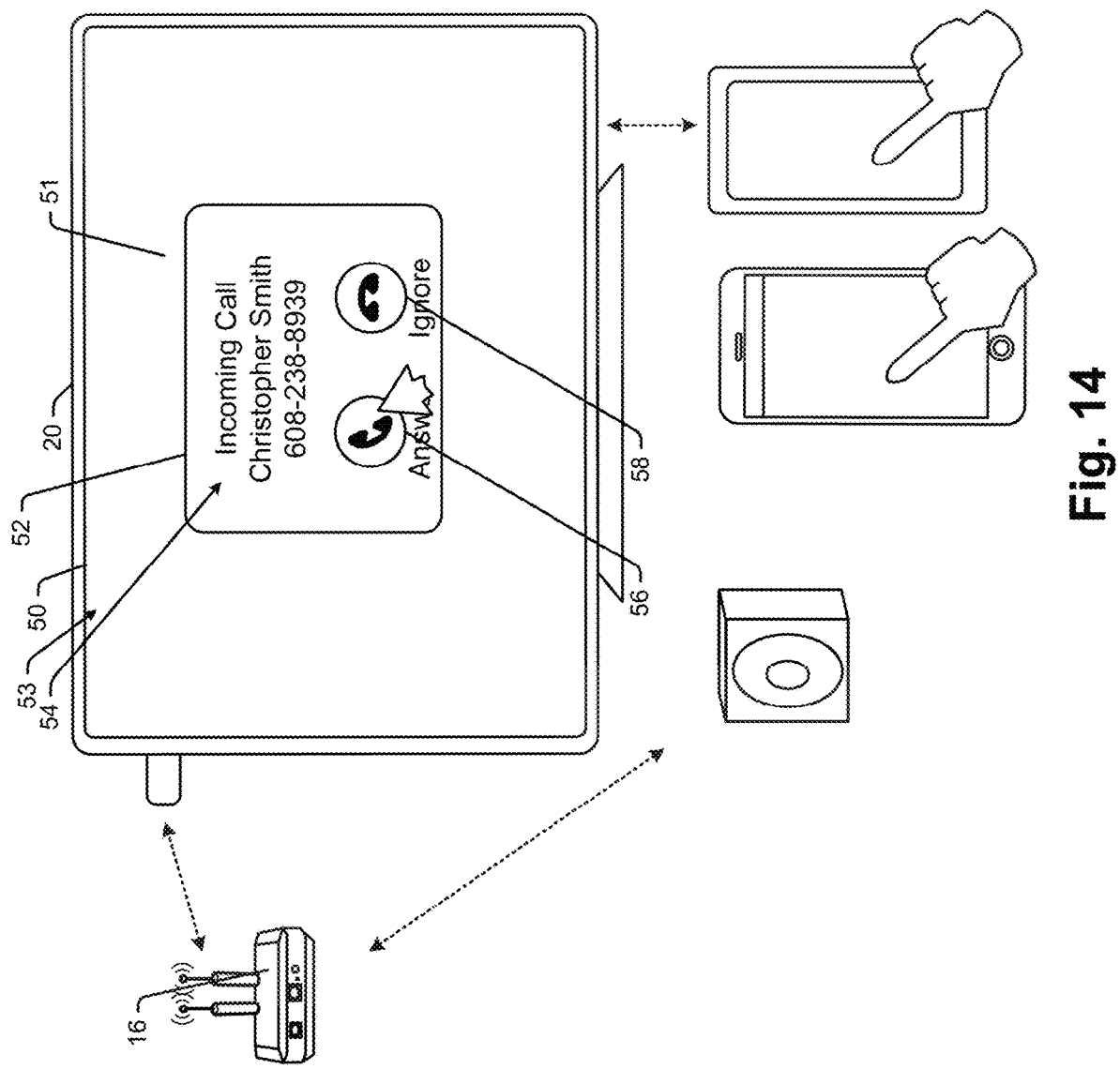
FIG. 14 is a depiction of a television in wireless communication with a portable tablet or other type of portable computing device, the television configured to serve as a display for an assisted user.
Figure 15:
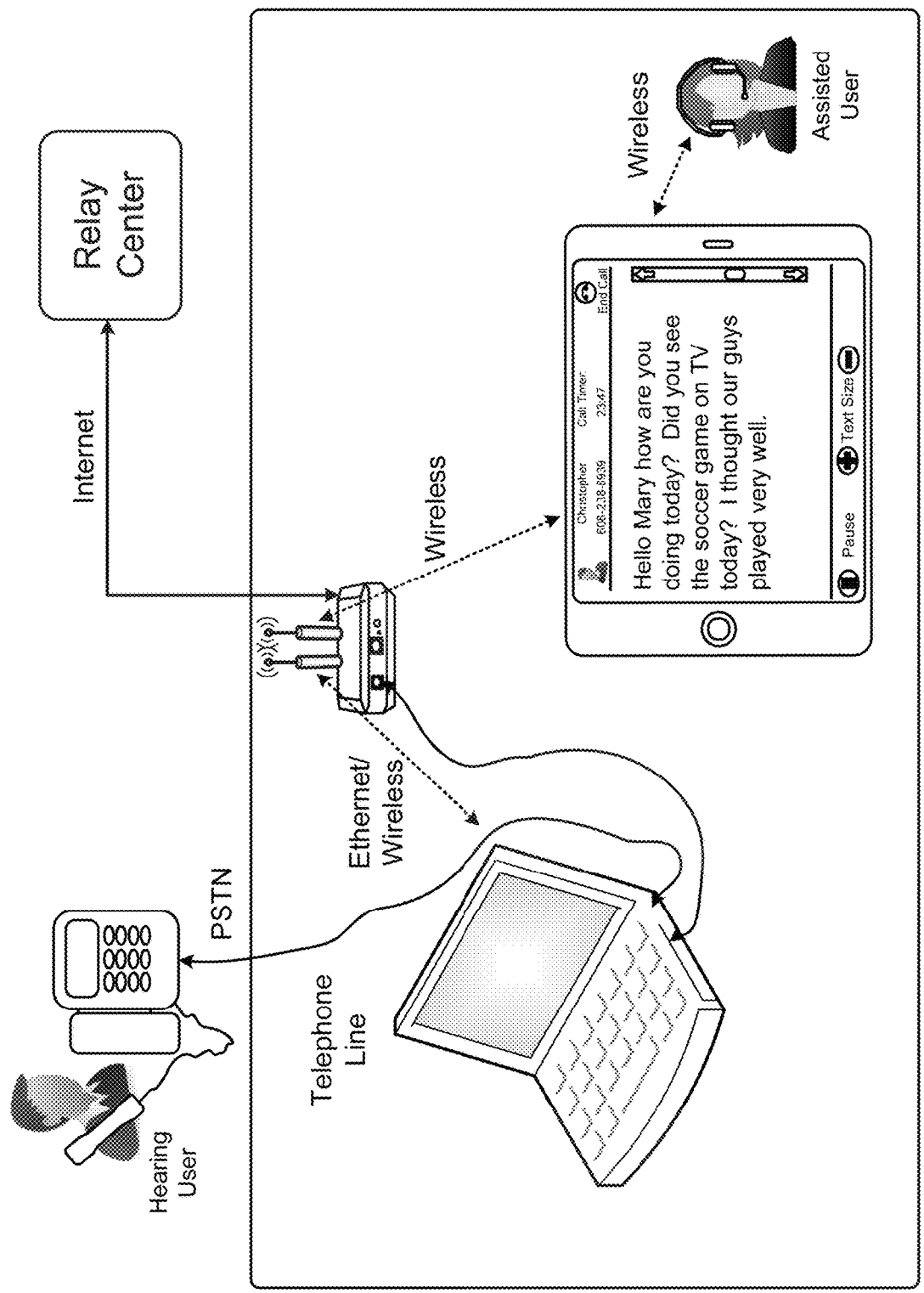
FIG. 15 is a depiction of a fourth exemplary communication system that can be used to facilitate communication between a hearing user and an assisted user.

In still other cases, instead of providing a full featured host captioned device, a relatively less expensive captioned device may be provided so that communication components that are provided via the client device 20 are not duplicated via the host device. For instance, see FIG. 11 that is similar to FIG. 1 except that the full featured captioned device 14 has been replaced by a captioned device brick component 100 (hereinafter "brick device 100"). Brick device 100 has all of the components and capabilities of host device 14 except for the display screen and handset (including eh speakers and microphone). Here, brick device 100 has an assigned phone number that can be used to receive an incoming call from a remote user's device 18. As in the case of host device 14 described above, device 100 can be controlled to link via a home network including router 16 to client device 20 to facilitate an audio only conversation between users of devices 18 and 20 or an audio/captioned communication session between device 18 and 20 users. For instance, when an initial call comes in to brick device 100, device 100 may link to client device 20 via router 16 and cause device 20 to announce the incoming call (see again FIG. 4). When the call is answered (e.g., icon 56 is selected in FIG. 4), brick device 100 may facilitate an audio only communication between the device 18 and 24 users at least initially, client device 20 presenting a Caption button option as in FIG. 9. If button 99 is selected, client device 20 would send a command to host brick device 100 to transmit the hearing user's voice signal from device 18 to relay 12 via router 16 and the second link (e.g., the Internet link In FIG. 11). Relay 12 transmits captioned text back to the brick device 100 which in turn transmits that text to client device 20 via router 16 to be presented on the client device display screen 50. In this case, because brick device 50 does not include a display, speakers or a microphone, the assisted user does not have the option to use device 100 as a direct input and output interface and instead would only use the client device 20 for those purposes.

In at least some cases a host device 14 and client device 20 will be used in a home or other facility where more than one phone device shares the phone line used by the host device 14 to link to remote user devices (e.g., 18). In this case, in at least some cases host device 14 will monitor when any phone linked to the incoming line if off hook and may transmit a signal indicating the off hook state to client device to be announced (e.g., presented as a visual queue) to a user of device 20 so that the device user understands the current state of the in coming line. Here, for instance, if the wife of an assisted user is using a different phone in the assisted user's home to participate in a call, the assisted user may not want to disturb that call and therefore the notice of phone line state would be desired.

In at least some cases it is contemplated that an assisted user may join an ongoing call that involves some other phone device in the assisted user's home or other associated space using a client device 20 and the assisted user may or may not add captioning to the joined call. For instance, in some cases when an ongoing call is progressing, client device 20 may present the option to "Join Call" via the device display 50 which, when selected, causes client device 20 to transmit a command to host device 14 to go off hook and connect the audio portion of the ongoing call to device 20 via router 16. If captions are not started immediately, when the assisted user wants to start the caption service, the user may select a caption icon as in FIG. 9 as described above.

Support case where text presented on tablet 20 and then moved to device 14.

Support case where text presented via phone device remotely and then when proximate device, 14, presenting text automatically via device 14 to take advantage or larger screen, speaker, etc.

While the invention may be susceptible to various modifications and alternative forms, specific embodiments have been shown by way of example in the drawings and have been described in detail herein. However, it should be understood that the invention is not intended to be limited to the particular forms disclosed. For example, Thus, the invention is to cover all modifications, equivalents, and alternatives falling within the spirit and scope of the invention as defined by the following appended claims.

To apprise the public of the scope of this invention, the following claims are made:

What is claimed is:

1. A method comprising the steps of, during a communication session with a remote device:
    obtaining, at a device, remote audio originating at the remote device;
    directing the remote audio from the device to a transcription system, the transcription system obtaining the remote audio of the communication session from the device;
    directing the remote audio from the device to a portable wireless communication device;
    obtaining captions at the device from the transcription system, the captions including a transcription of the remote audio generated by the transcription system; and
    directing the captions from the device to the portable wireless communication device, the communication device obtaining the captions from the device.

2. The method of claim 1 further comprising, during the communication session:
    obtaining local audio at the device; and
    directing the local audio from the device to the remote device.

3. The method of claim 2 further comprising, during the communication session, directing the local audio to a second communication device and, wherein, the second communication device and the portable wireless communication device are both associated with a user of the device.

4. The method of claim 3 wherein the device is a captioned device, including a display screen and capable of presenting captions via the display screen and the second communication device is a headset.

5. The method of claim 1, wherein each of the device and the portable wireless communication device is associated with a user.

6. The method of claim 1 wherein the device communicates with the transcription system and the portable wireless communication device through a router.

7. The method of claim 6 wherein the router is a wireless router.

8. The method of claim 1 wherein the portable wireless communication device is configured to broadcast the remote audio to a user via a speaker.

9. The method of claim 1 wherein the remote audio is directed to the transcription system over a first network of a first network type and the remote audio is directed to the portable wireless communication device over a second network of a second network type that is different than the first network type.

10. The method of claim 1 wherein the portable wireless communication device is a portable tablet type computing device including a display screen, a speaker and a microphone, the communication device obtaining local audio via the microphone and directing the local audio to the remote device, the communication device presenting the captions via the display screen and broadcasting the remote audio via the speaker.

11. A device comprising:
    one or more computer-readable media configured to store software; and
    at least one processor communicatively coupled to the computer-readable media, the at least one processor configured to execute the software to cause the device to perform operations, the operations comprising, during a communication session involving a remote device:
    obtaining remote audio originating at the remote device;
    directing the remote audio to a transcription system, the transcription system obtaining the remote audio of the communication session from the device;
    directing the remote audio to a portable wireless communication device;
    obtaining captions from the transcription system, the captions including a transcription of the remote audio generated by the transcription system; and
    directing the captions to the portable wireless communication device, the portable wireless communication device obtaining the captions from the device.

12. A method comprising the steps of, during a communication session with a remote device:
    obtaining, at a device, remote audio originating at the remote device;
    directing the remote audio from the device to a first local device, the first local device being configured to receive and broadcast the remote audio to a user; and
    directing, captions that include a transcription of the remote audio from the device to a second local device, the second local device being configured to display the transcription of the remote audio.

13. The method of claim 12 wherein the step of directing remote audio to the first local device includes transmitting the remote audio from the device to the second local device and transmitting the remote audio from the second local device to the first local device.

14. The method of claim 12 wherein the device is a captioned device, the first local device is a headset and the second local device is a portable tablet type computing device.

15. The method of claim 12 wherein the second local device obtains the captions from the device.

16. The method of claim 12 further comprising, during the communication session:
    directing the remote audio from the device to a transcription system; and
    obtaining the captions from the transcription system at the device during the communication session, the captions generated by the transcription system.

17. The method of claim 16 wherein the transcription system obtains the remote audio from the device.

18. The method of claim 12 wherein the second local device obtains the transcription of the remote audio only from the device.

19. The system of claim 12 wherein the first device obtains local audio and provides the local audio to the remote device.

20. The system of claim 19 wherein the local audio is obtained from the communication device.

21. The system of claim 19 wherein each of the first device and the communication device is associated with a user.

22. The system of claim 21 wherein the first device is not configured to broadcast the remote audio to the user.

23. A system for use during a communication session with a remote device, the system comprising:
  a communication device configured to broadcast remote audio;
  a first device comprising:
    (i) a first network link configured to obtain remote audio originating at a remote device;
    (ii) a second network link configured to direct, the remote audio to a transcription system and to obtain captions from the transcription system, the captions including a transcription of the remote audio generated by the transcription system and the transcription system obtaining the remote audio of the communication session only from the device;
    (iii) a third network link configured to direct the remote audio to the communication device for broadcast; and
  a display configured to present the transcription.

24. The system of claim 23 wherein the first device is a wireless router.

25. The system of claim 23 wherein, during the communication session:
  the third network link is configured to obtain local audio from the communication device, and
  the first network link is configured to direct the local audio to the remote device.

26. The system of claim 23, wherein the first network link is of a first network link type and the second network link is of a second network link type that is different than the first network link type.

27. The method of claim 3 wherein the second communication device includes a speaker and wherein teh second communication device broadcasts the remote audio.

28. The method of claim 4 wherein the captioned device presents the captions via the display screen.

29. The method of claim 28 wherein the portable computing device includes a display screen and wherein the captioned device and the portable computing device present the captions substantially simultaneously.

30. The method of claim 1 further including, prior to obtaining the remote audio, receiving an incoming call at the device from the remote device to initiate the communication session, presenting a first incoming call indication via the device, transmitting a signal to the wireless communication device and in response thereto, presenting a second incoming call warning signal via the wireless communication device.

31. The method of claim 30 further including presenting a selectable call answer option via the wireless communication device, detecting selection of the call answer option, transmitting a call answer signal to the device, and in response to the call answer signal, causing the device to answer the incoming call.

32. The method of claim 31 wherein the device is usable to answer the incoming call.

33. The method of claim 1 further including, prior to obtaining the remote audio, using the wireless communication device to initiate a communication link to the device and using the wireless communication device to control the device to initiate a call to the remote device.

34. The method of claim 1 wherein the portable wireless communication device includes a first display screen and presents the captions via the display screen.

35. The method of claim 30 wherein the device includes a second display screen, the portable wireless communication device presents a selectable change device button, the method further including, while the captions are presented via the portable wireless communication device, detecting selection of the change device button and in response to detecting selection of the change device button, causing the device to present the captions via the second display screen.

36. The method of claim 35 wherein the portable wireless communication device and the device include first and second speakers, respectively, and wherein the device that presents captions also broadcasts the remote audio.

37. The method of claim 1 further including the steps of receiving a session termination input via the portable wireless computing device and in response terminating the communication session between the remote device and the device.

38. The method of claim 1 wherein the device links to the transcription system via a router and wherein the link from the device to the router is an Ethernet link and the link from the router to the relay is an Internet link.

39. The method of claim 38 wherein the device links to the portable wireless communication device via the router wherein the link from the router to the portable wireless communication device is a wireless link.

40. The method of claim 16 wherein the second local device is a portable wireless communication device, the step of directing captions to the second local device includes wirelessly transmitting the captions to the portable wireless communication device.

41. The method of claim 40 wherein the portable wireless communication device is a tablet type computing device.

42. The method of claim 12 wherein the first local device is a headset including a speaker and wherein the headset broadcasts the remote audio via the speaker.

43. The method of claim 42 wherein the headset also includes a microphone and wherein the headset obtains local audio via the microphone and directs the local audio to the device, the device transmitting the local audio to the remote device.

44. The method of claim 12 wherein the first local device is one of a neck loop a hearing aid and a cochlear implant.

45. The method of claim 12 wherein the device is a captioned device including a display and wherein the captioned device is configured to present the captions via the display.

46. The method of claim 12 wherein the second local device includes a television.

47. The method of claim 46 wherein the first local device is a speaker that is independent of the television.

\* \* \* \* \*